US008600790B1

United States Patent
Peacock, III et al.

(10) Patent No.: US 8,600,790 B1
(45) Date of Patent: Dec. 3, 2013

(54) SYSTEM AND METHOD FOR PRESENTING AN INTERNET SURVEY TO PRE-QUALIFIED VISTORS TO A WEBSITE

(75) Inventors: Frank Charles Peacock, III, Denton, TX (US); Russell Paul Cowdrey, Coppell, TX (US); Lon Cartwright Ingram, Austin, TX (US)

(73) Assignee: Usability Sciences Corporation, Irving, TX (US)

( * ) Notice: Subject to any disclaimer, the term of this patent is extended or adjusted under 35 U.S.C. 154(b) by 1315 days.

(21) Appl. No.: 12/008,329

(22) Filed: Jan. 10, 2008

(51) Int. Cl.
*G06Q 10/00* (2012.01)
(52) U.S. Cl.
USPC ............................................. 705/7.11
(58) Field of Classification Search
None
See application file for complete search history.

(56) References Cited

U.S. PATENT DOCUMENTS

| | | | | |
|---|---|---|---|---|
| 6,871,197 | B1 * | 3/2005 | Johnson | 706/61 |
| 6,993,495 | B2 * | 1/2006 | Smith et al. | 705/7.32 |
| 7,013,285 | B1 * | 3/2006 | Rebane | 705/7.31 |
| 7,325,188 | B1 * | 1/2008 | Covington et al. | 715/234 |
| 2002/0007303 | A1 * | 1/2002 | Brookler et al. | 705/10 |
| 2004/0059624 | A1 * | 3/2004 | Wantulok et al. | 705/10 |
| 2005/0021791 | A1 * | 1/2005 | Sakiyama et al. | 709/229 |
| 2005/0071219 | A1 * | 3/2005 | Kahlert et al. | 705/10 |
| 2005/0091111 | A1 * | 4/2005 | Green et al. | 705/14 |
| 2005/0132267 | A1 * | 6/2005 | Aviv | 715/500.1 |
| 2007/0101258 | A1 * | 5/2007 | Xu et al. | 715/516 |
| 2008/0028313 | A1 * | 1/2008 | Ebert | 715/730 |
| 2008/0154949 | A1 * | 6/2008 | Brooks et al. | 707/103 R |

* cited by examiner

*Primary Examiner* — Jason Dunham
*Assistant Examiner* — Venay Puri

(57) ABSTRACT

A system, method, and computer readable medium comprising instructions for providing a survey to a user comprises accessing a web site by the user, determining if the user is qualified to partake in a survey related to the web site, tracking the user's interaction with the web site when the user is qualified to partake in the survey, presenting the survey to the user based on the user's interaction, receiving responses to the survey, tracking the user's further interaction with the web site, determining if a page unload event followed by a page load event occurs within a period of time, determining if the user has left the web site when the page unload event followed by the page load event does not occur within the period of time, presenting a static first portion of an additional survey to the user, and presenting a dynamic second portion of the additional survey to the user based on at least one of: the user's further interaction with the web site, the user's interaction with the web site, and the user's responses to the survey, when it is determined that the user has left the web site.

11 Claims, 26 Drawing Sheets

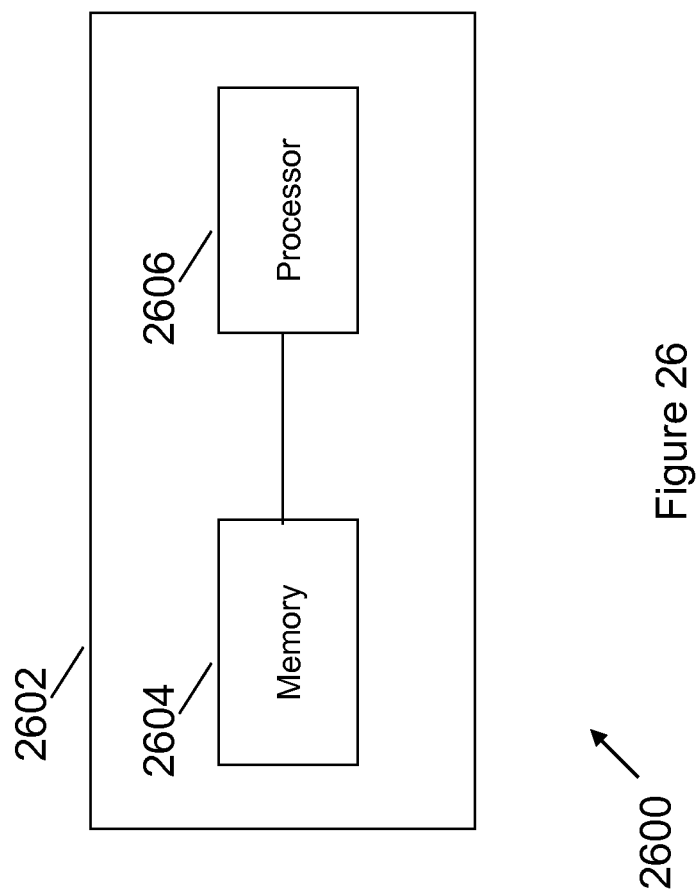

SYSTEM AND METHOD FOR PRESENTING AN INTERNET SURVEY TO PRE-QUALIFIED VISTORS TO A WEBSITE

TECHNICAL FIELD OF THE INVENTION

This invention relates generally to the field of network applications and services, and more particularly, to a system, method and computer readable medium comprising instructions for providing a survey to a user.

BACKGROUND OF THE INVENTION

The Internet is a collection of disparate computer systems which use a common protocol to communicate with each other. A common use of the Internet is to access World Wide Web (Web) pages. Web pages are typically stored on a server and remotely accessed by a client over the Internet using a web browser.

A web site is a collection of web pages. A web site includes typically a home page and a hierarchical order of follow on web pages that are accessible through the home page. The web pages are connected to each other using hypertext links. The links allow a user to browse web pages of a web site by selecting the links between the web pages. Distinct Web sites may be respectively identified by respective distinct associated Internet domain names.

To increase user visitations and revenue, web sites have become very sophisticated. Web sites typically include web pages that provide information to users, advertise products or services to users and/or provide site search functions for users. A problem for web site owners is to determine how successful the web site is, for example, whether the informational or other needs of users are met and whether the users are purchasing advertised goods and services.

Traditional marketing studies directed toward target market demographics are of limited effectiveness in gauging user satisfaction with web sites. Online methods of gathering information from visitors regarding web site satisfaction are intrusive and have not been well received. Moreover, such systems typically require extensive reprogramming of a web site, which is time consuming and costly.

Another problem is the limited ability to collect information from one Web page to another, across a Web site. Plug-ins and other programs requiring installation are too intrusive while ActiveX and other controls that are based on component object model (COM) objects require modifying a user's system in order to continue with the preferred information gathering process. ActiveX controls are not unloaded from an operating environment when a visitor moves from one Web page to another, across a Web site. This is an issue as a control must first be downloaded in order to run, and is not a preferred method of proceeding as it is deemed to be too intrusive to users, as their browsing experience must stop for a short period, and their computer medium be modified in order to participate and gather the necessary data. Moreover, any client-side scripting language has controls which are unloaded when the visitor moves from one Web page to another, across a Web site. The mechanisms these client-side scripting languages use are also, for the most part, not preserved across web site domains, much more so than pages since changing domains disallows the normal form of preserving session state information. As such, what is needed is a system, method, and computer readable medium comprising instructions for overcoming such limitations.

SUMMARY OF THE INVENTION

The present invention provides an improved client-side application and method for monitoring activities of a visitor to a Web or other network site. In particular, the present invention provides tracking a user's interaction with a web site, providing a dynamic survey to the user based on the user's interaction with the web site, page tagging to determine exit events from a Web site and presenting a survey or a portion of a survey to a user when it is determined that the user has exited the Web site.

In accordance with one embodiment of the present invention, a method for providing a survey to a user comprises accessing a web site by the user, determining if the user is qualified to partake in a survey related to the web site, tracking the user's interaction with the web site when the user is qualified to partake in the survey, presenting the survey to the user based on the user's interaction, receiving responses to the survey, tracking the user's further interaction with the web site, determining if a page unload event followed by a page load event occurs within a period of time, determining if the user has left the web site when the page unload event followed by the page load event does not occur within the period of time, presenting a static first portion of an additional survey to the user, and presenting a dynamic second portion of the additional survey to the user based on at least one of: the user's further interaction with the web site, the user's interaction with the web site, and the user's responses to the survey, when it is determined that the user has left the web site.

In accordance with one embodiment of the present invention, a computer readable medium comprises instructions for: tracking a user's interaction with a web site, presenting a survey to the user based on the user's interaction, receiving responses to the survey, tracking the user's further interaction with the web site, presenting a dynamic survey to the user based on the user's further interaction with the web site, receiving responses to the dynamic survey, determining if a page unload event followed by a page load event occurs within a period of time, determining if the user has left the web site when the page unload event followed by the page load event does not occur within the period of time, presenting a static first portion of an additional survey to the user, and presenting a dynamic second portion of the additional survey to the user based on at least one of: the user's further interaction with the web site, the user's interaction with the web site, the user's responses to the survey, the user's responses to the dynamic survey, when it is determined that the user has left the web site.

In accordance with one embodiment of the present invention, a system for providing a survey to a user, comprises a first server, a second server, and an electronic device communicably coupled to the first server and to the second server, wherein the second server interacts with the electronic device by providing an invite Hypertext Markup Language (HTML) file and a survey HTML file and includes an various JavaScript libraries and an Active Server Pages (ASP) page that records various events occurring at the electronic device when a user interacts with a loaded web page from the first server, wherein the first server includes a JavaScript page tag that is provided by the second server and that references the JavaScript libraries and an invite HTML file that is used to display an invitation to a user interacting with the loaded web page.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 26 is a system diagram in accordance with one embodiment of the present invention.

DETAILED DESCRIPTION OF THE INVENTION

Figure 1:
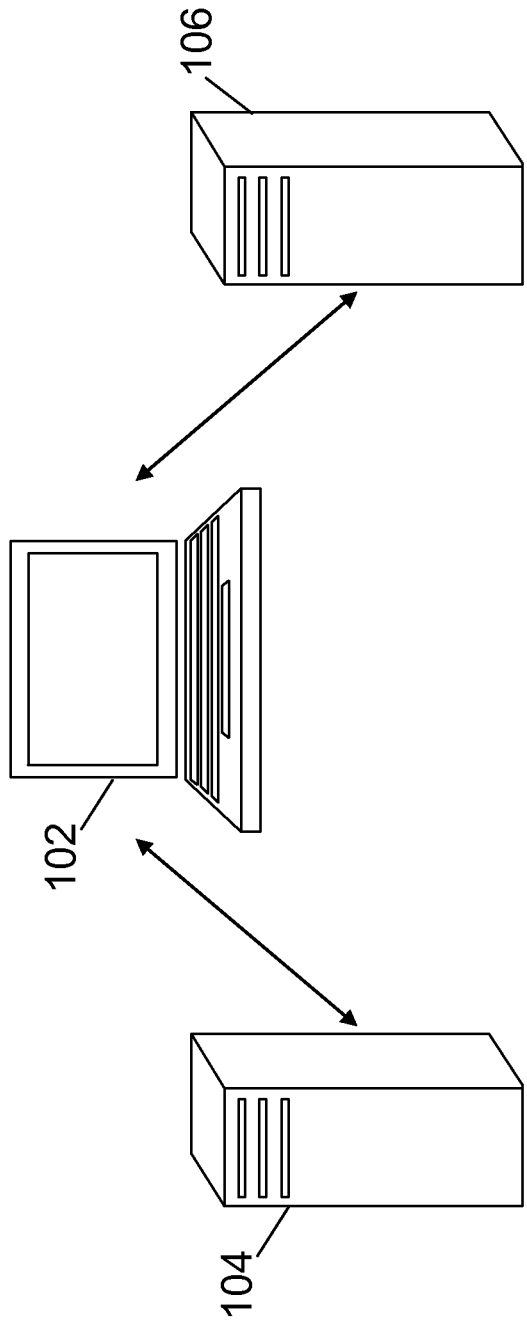
FIG. 1 is a block diagram illustrating a system for gathering feedback from visitors to a Web site in accordance with one embodiment of the present invention.

FIG. 1 illustrates a network based system 100 for gathering feedback from visitors to a network site in accordance with one embodiment of the present invention. In this embodiment, the network site is a World Wide Web (Web) site including a plurality of Web pages. The Web site is accessed by visitors over the Internet. It will be understood that the network site may be any other suitable type of site providing remotely accessed information and/or services. The network may be any other suitable type of network, such as local area network (LAN), wide area network (WAN), intranet, extranet or combinations of networks (not shown).

Referring to FIG. 1, the system 100 includes an electronic device 102 operable to retrieve and display Web pages including data, images, video, and multimedia information to a user (not shown). Although depicted as a computer, the electronic device 102 may be any device able to retrieve and display Web pages including a cellular phone, a wireless phone, a personal digital assistant, a laptop, a television, a set-top box, and the like. Web pages are loaded and displayed on the electronic device 102 from a server 104 when the electronic device 102 accesses a network site such as www.example.com (or example.com). A server 106, with a network site such as www.webiqonline.com (or webiqonline.com) also interacts with the electronic device 102 by providing an invite Hypertext Markup Language (HTML) file and a survey HTML file and includes various JavaScript libraries and an Application Service Provider (ASP) page that records various events occurring at the electronic device 102 when a user interacts with the loaded web page(s) from the server 104. The server 104 includes a JavaScript page tag that is provided by the server 106 and that references the JavaScript libraries and an invite HTML file (or invite shim HTML file) that is used to display an invitation to a user interacting with the loaded web page(s). The script is provided by the server 106 during the loading of the web page before the page is fully loaded, is served over TCP/IP and runs natively client-side. The script comprises the object model used to perform the communication between the server 106 and the device 102.

The elements of FIG. 1, including the electronic device 102 and the servers 104 and 106, communicate with each other using the Transmission Control Protocol/Internet Protocol (TCP/IP) or other suitable protocols. The elements are communicably coupled via at least one of: cable, optical, radio frequency and/or other suitable wireline and/or wireless links. The elements comprise hardware and/or software operable to perform the functionality of the system 100. The hardware comprises a general purpose processor and/or application specific integrated circuits (ASIC), field programmable gate arrays (FPGA) and/or other logic encoded hardware. The software comprises instructions or other logic encoded in any suitable medium, such as diskette, compact disk (CD), hard drive or other memory media.

The server 104 includes a customer Web site having at least one Web page (but preferably a plurality of web pages) that provide at least one of: information to users or site visitors, advertisements of goods and services available from the Web site, search functionality for finding information in the Web site 30 and other suitable information and functions. The Web pages preferably include a home, or main page, and follow on pages connected to each other in the Web site by hyperlinks.

Figure 2:
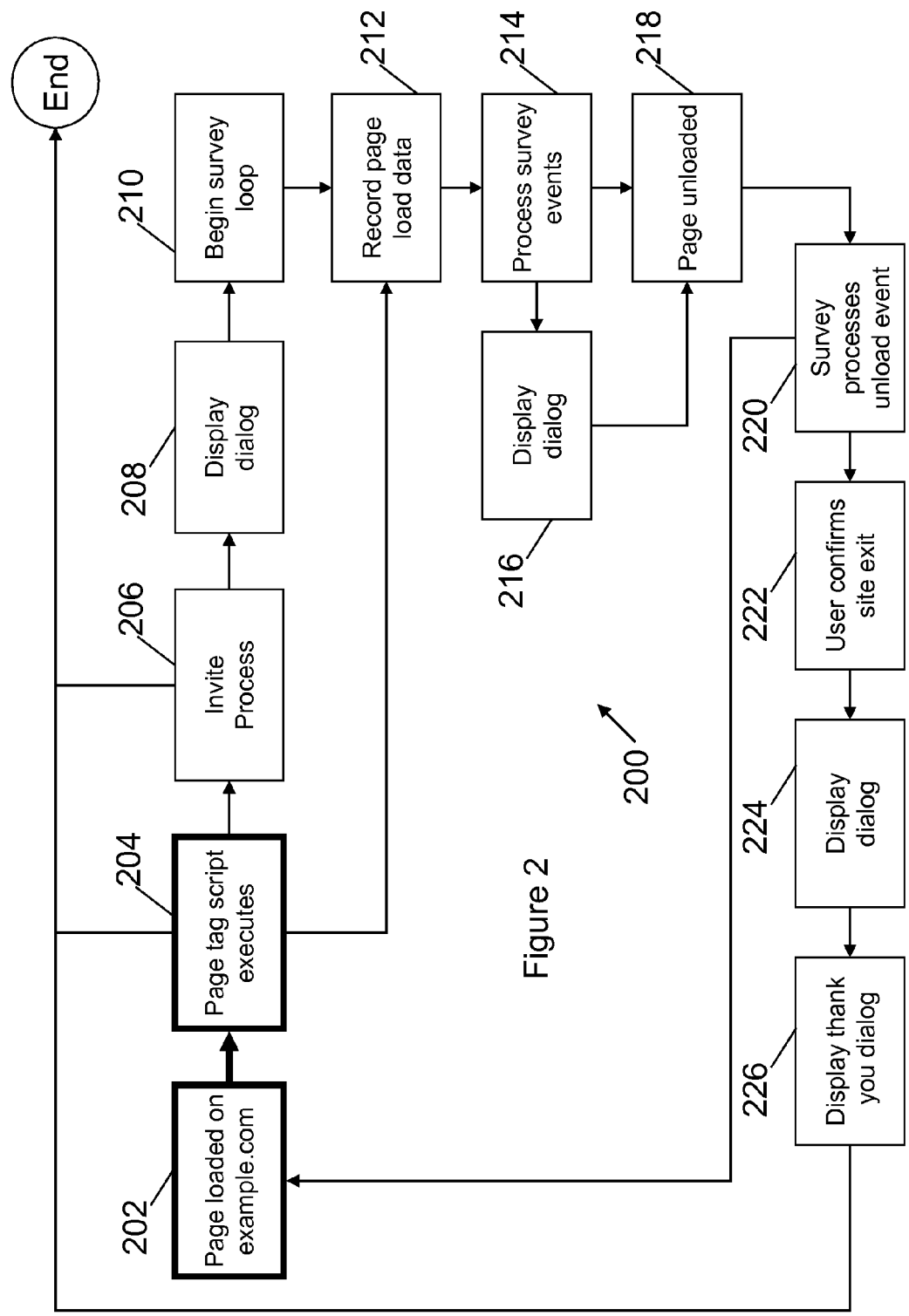
FIG. 2 is a flow diagram illustrating a method for gathering feedback from visitors to a Web site with emphasis on page loading and page tagging in accordance with one embodiment of the present invention.

FIG. 2 is a flow diagram 200 illustrating a method for gathering feedback from visitors to a Web site with emphasis on page loading and page tagging. At step 202, the user loads a page on server 102 or example.com that includes the JavaScript page tag (or script) and at step 204 the script executes. At step 206, the user is invited to begin the survey and at step 208 a survey dialog is displayed to the user, preferably in a separate window. At step 210 the survey loop begins in the dialog window and at step 212 the page load is recorded to the database. At step 214 any survey events are processed by the survey dialog window and at step 216 a survey dialog is displayed to the user. At step 218 the user unloads the page by closing the browser window or navigating to another page and at step 220 the survey dialog window processes the unload event. At step 222 if another tagged page is not loaded within a certain period of time, the survey dialog windows brings itself to the front of any open Web page(s) and displays a dialog for the user to confirm that they have left the site. At step 224 a survey dialog is displayed to the user and at step 226 a dialog is displayed to the user thanking them for their participation. Although depicted in a certain manner, various steps can be omitted (for example, step 226) or the functionality performed by the steps can be combined (for example, steps 222 and 224) without departing from the scope of the present invention.

The time function related to the page loads and unloads is performed as follows: a page unload event is processed by a file such as 'survey.html' which sets a short (configurable) delay and a flag called, for example, 'waitingForLoad.' After the delay, the event queue is processed. If a load event is found, then waitingForLoad is set to false and normal operation is resumed. If not, a longer (configurable) delay is set, and waitingForLoad is cleared and is SiteExit is set. After the delay, the event queue is processed. If no load event is found, is SiteExit is cleared and the site exit confirmation dialog is displayed.

Figure 3:
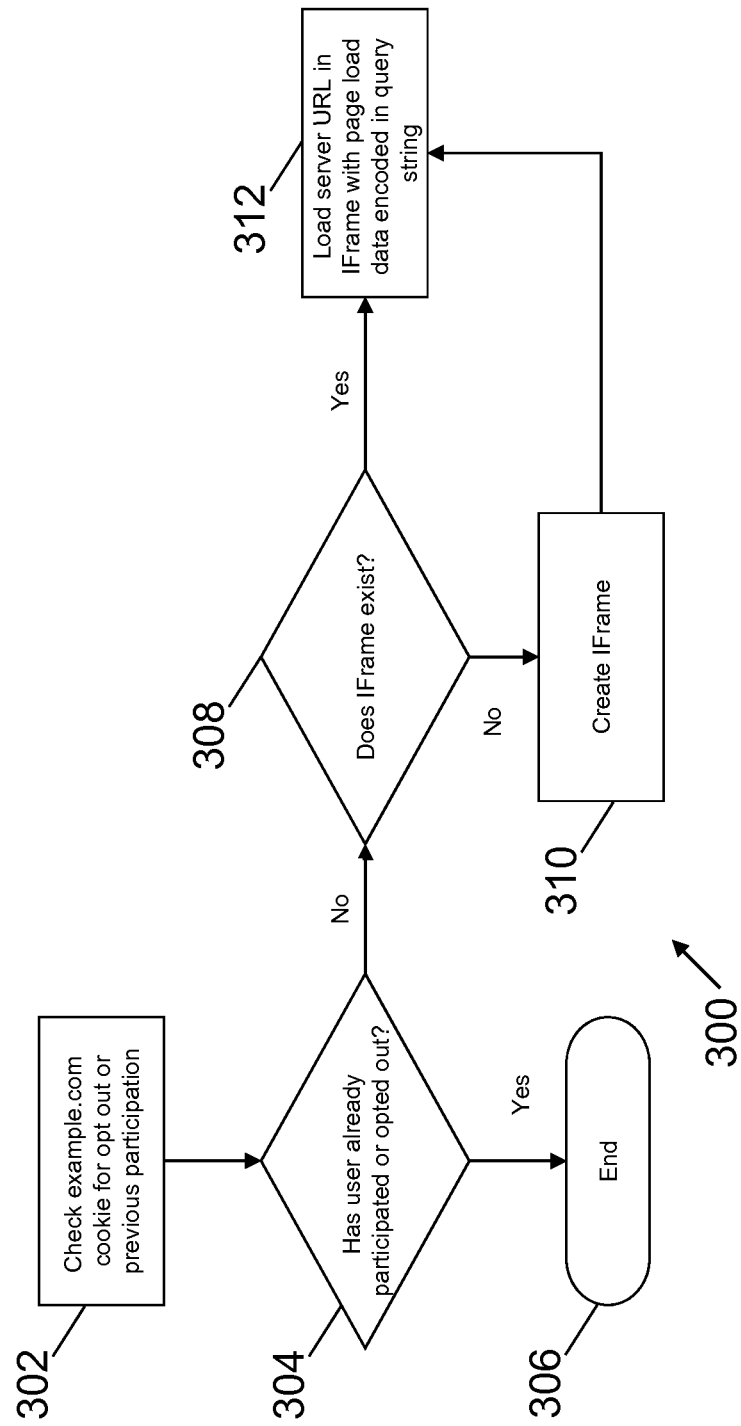
FIG. 3 is a flow diagram illustrating a method for page tagging in accordance with one embodiment of the present invention.

FIG. 3 is a flow diagram 300 illustrating a method for page tagging and includes step 302 where the script attempts to load at least one cookie on example.com indicating that the user has already participated or opted out of participation and step 304 where the script checks to see if the cookie exists. The cookie(s) are set by server 104 at the behest of server 106 (by the invite, after the user indicates if they want to participate or not). A length of time that the user is prevented from seeing the invite is configurable. It ranges from 'for the rest of the session' to 'indefinitely.' The cookie(s) may be set by webiqonline.com and by example.com. Currently, the cookie is set when the user completes the survey, so if a user did not complete the survey and then returned to the site during another browsing session, they would see the invite again. In one embodiment, cookies are set with the data containing page load events, previously submitted values and the point or location where a user or visitor left the survey, such a user can be redirected to the last recorded page and minimized survey dialogs can be displayed.

At step 306, if the cookie exists, then the script exits, and at step 308 if the cookie does not exist, the script checks to see if an IFrame already exists in the Document Object Model (DOM) for the page. An IFrame is a self-contained part of a website which can be interacted with on a webpage and the DOM is the Document Object Model of the webpage and determines how the web browser renders the page. The DOM typically contains an element in order for it to be accessible by other parts of the webpage. If the IFrame does not exist, then the script creates an IFrame and inserts it into the DOM at step 310 (which can be performed via a create and an insert command). At step 312, the script creates a server page URL with the page load data encoded in its query string and sets the IFrame's location to it.

Figure 4:
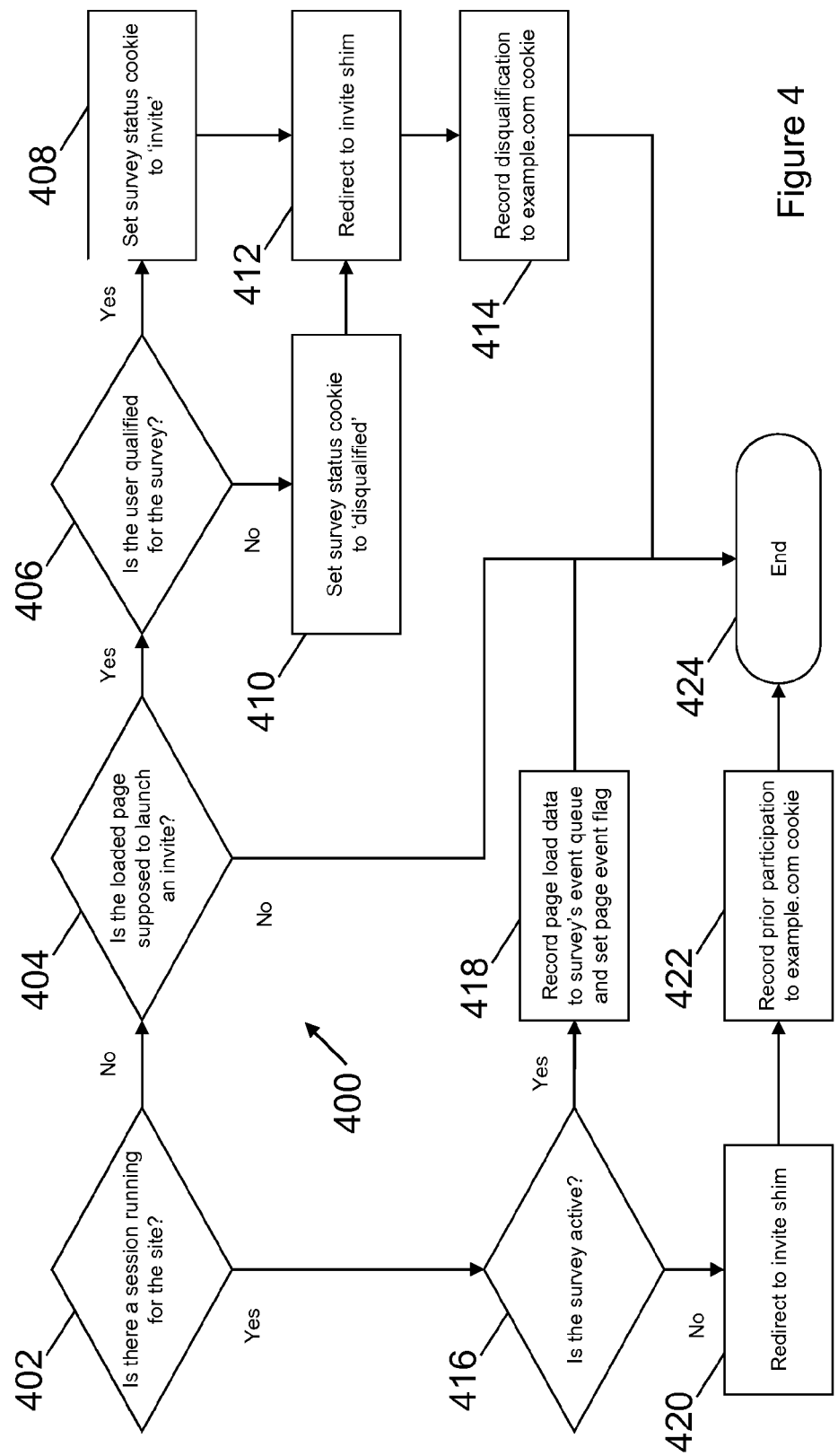
FIG. 4 is a flow diagram illustrating a method for page loading in accordance with one embodiment of the present invention.

FIG. 4 is a flow diagram 400 illustrating a method for processing page load information received in a query string. When the server page loads, the script checks a cookie to see if there is a session running for example.com at step 402. If not, the script checks to see if the loaded page matches any URL patterns for invite pages at step 404. If so, the script checks that the user's browser meets all qualifications for the survey at step 406. A specific variable is set for the loaded invitation page(s) which are stored on webiqonline.com in the server page. That determines whether or not the invite is displayed. The variable, for example called invitePages, contains a list of patterns that the loaded URL is matched against. If the URL matches the pattern, the invite process begins. If the user's browser meets all qualifications, a cookie is written to webiqonline.com indicating that the session is in 'invite' status. If not, a cookie is written to the server 106 or webiqonline.com indicating that the session is in 'disqualified' status at step 410. The server page sets the IFrame's location to the URL of the invite shim at step 412. If the user is disqualified, the invite shim records that status to a cookie on example.com at step 414.

If there is a session running for the site, the script checks to see if the survey is active at step 416 and if it is, the page load data is recorded to the survey dialog's event queue cookie and the page event flag is set at step 418. The page event flag is either true or false. If true, the server 106 records a page unload event to the event queue when the server's OnUnload event fires. If false, the server does not record a page unload event. This is necessary because the server is involved in the invite process during which time unload events should not be recorded. More specifically, the event queue is implemented via a cookie on webiqonline.com. The server 106 takes each event object and packages it up in a delimited string format and appends it to the value of that cookie. The survey then reads the cookie and clears it. It then takes the value of the cookie and parses it into event objects, which it then processes. If the session is not active, a redirection to the invite shim occurs at step 420 and a prior participation cookie is recorded on example.com at step 422. The process ends at step 424.

Figure 5:
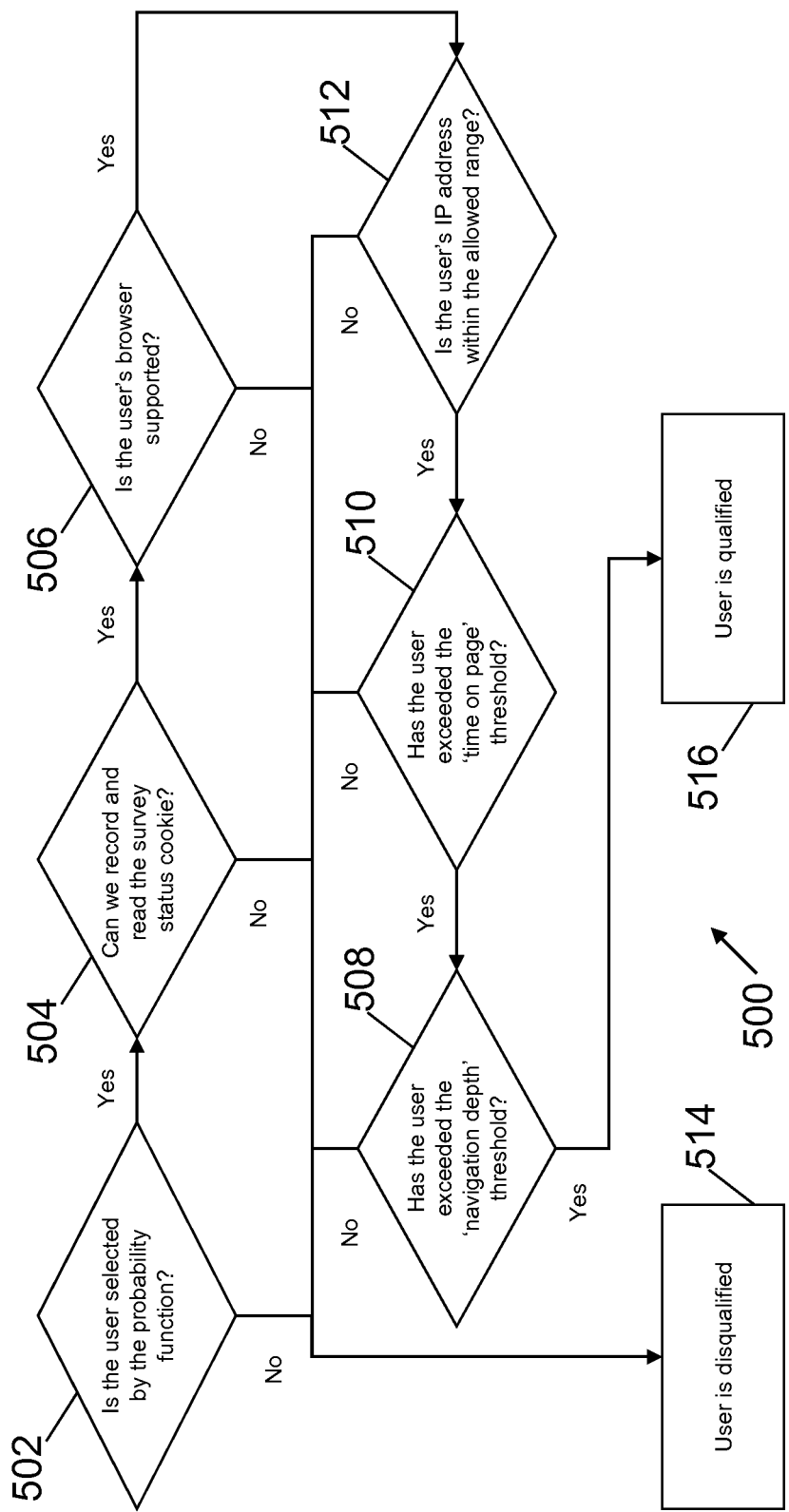
FIG. 5 is a flow diagram illustrating a method for qualifying a user in accordance with one embodiment of the present invention.

FIG. 5 is a flow diagram 500 illustrating a method for qualifying a user. Any of the following qualification steps may be omitted without departing from the scope of the present invention. The script generates a random number between 0 and 1 and checks to see if it falls below a specified probability which is set as a rate at step 502. The random number, which is a fraction of 1, is/can be multiplied to the random number to give a different threshold than is previously set. The script confirms that the user's browser is configured to allow the server 106 to record and read cookies at step 504 and the script confirms: that the user's browser is supported by the survey at step 506, that the user has navigated a specified number of pages into the example.com website at step 508, and that the user has viewed the loaded example.com page for a specified amount of time at step 510. At step 512, the script checks that the user's IP address falls within an allowed range for the survey. If any of these tests fail, the user is disqualified and no further tests are performed at step 514. If all tests succeed, the user is qualified at step 516. Other qualifications that may be used are based on the machine the user is using (operating system, browser version), or a subsequent screener question in the opt-in itself.

Figure 6:
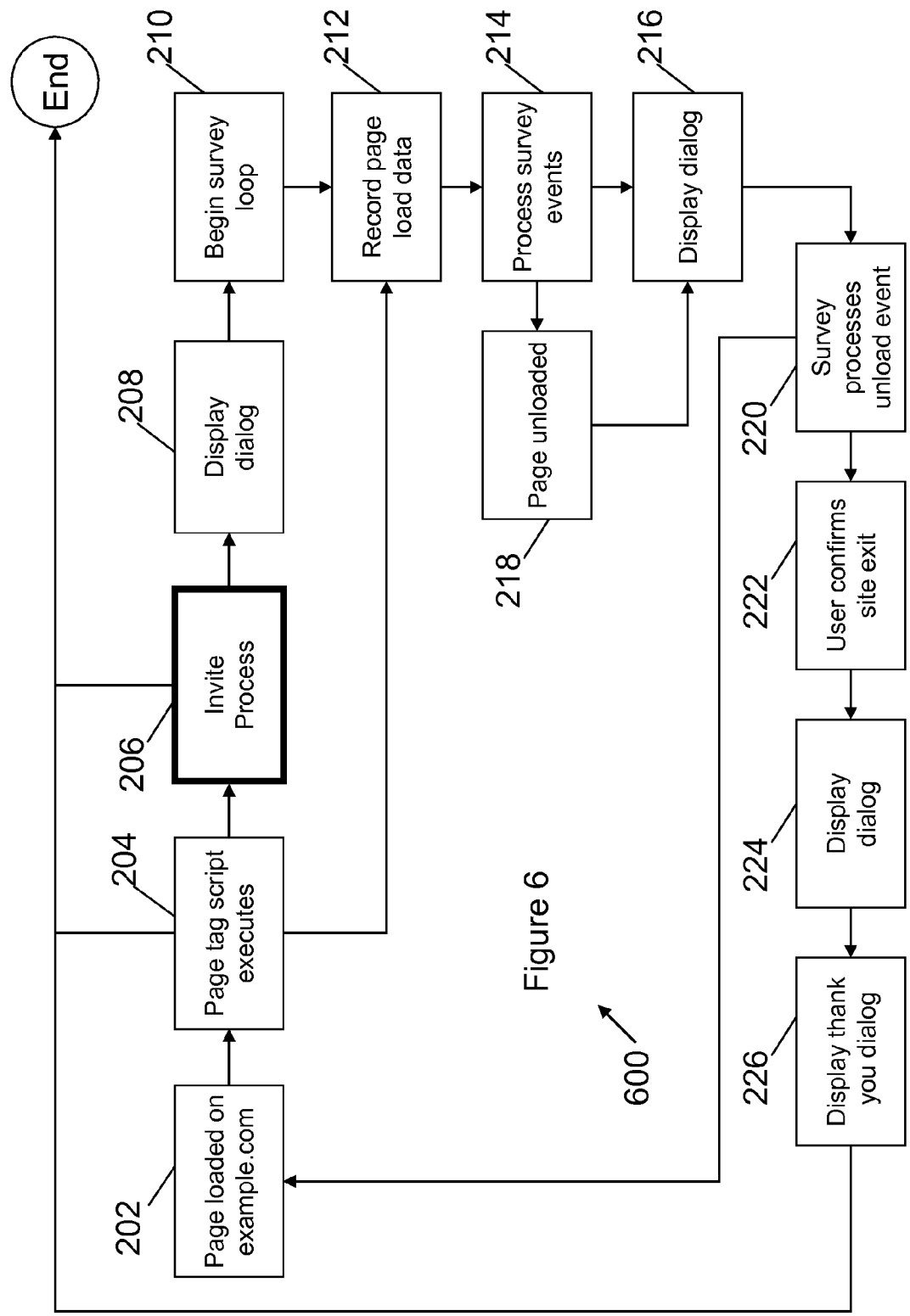
FIG. 6 is a flow diagram illustrating a method for gathering feedback from visitors to a Web site with emphasis on an invite process in accordance with one embodiment of the present invention.

FIG. 6 is a flow diagram 600, similar to FIG. 2, illustrating a method for gathering feedback from visitors to a Web site with emphasis on an invite process.

Figure 7:
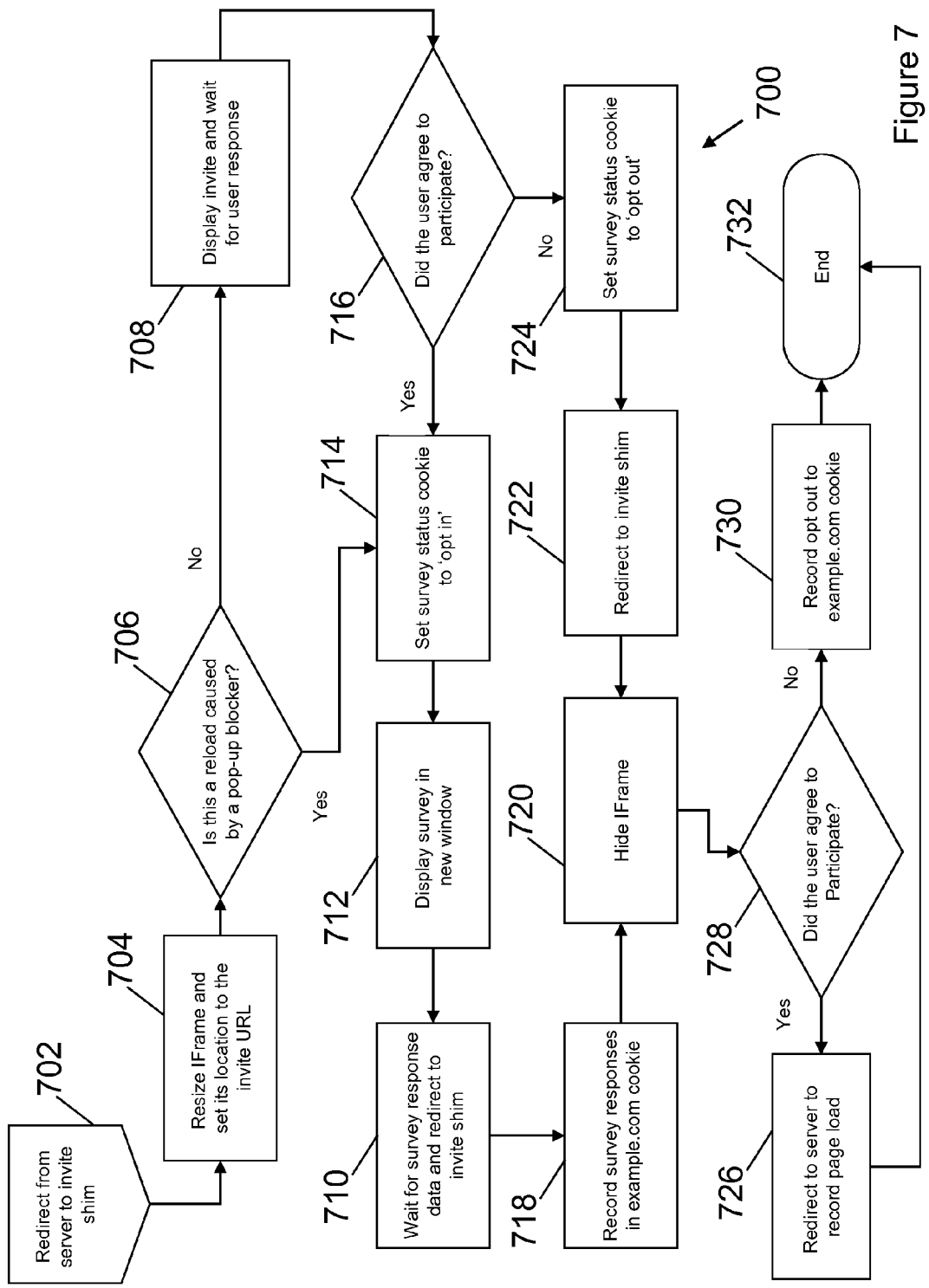
FIG. 7 is a flow diagram illustrating the invite process in accordance with one embodiment of the present invention.

FIG. 7 is a flow diagram 700 illustrating the invite process. The invite shim is loaded in the IFrame after a redirect from the server page at step 702. In general, during a redirect to an invite shim, the invite shim parses a query string and looks for a value of a query value called, as an example, 'action'. It then hides/shows the IFrame and writes/reads cookies based on the value. The invite shim is responsible for displaying and hiding the invite dialog as well as writing example.com cookies if the user opts out of taking a survey. The script resizes the IFrame to a specified width and height and positions it at an arbitrary point on the page. It then redirects to the invite page on webiqonline.com at step 704. The invite page script checks to see if it is being displayed after a popup blocker reloaded the page at step 706. If not, it displays a dialog asking the user if they would like to participate in the survey at step 708. When the user clicks a button on the dialog or otherwise engages the dialog, the script checks their response at step 716. If the user agreed to participate, the session cookie is set to a status of 'opt in' at step 714 and the script launches the survey in a new window at step 712. The script sets a timeout and checks periodically to see if the user has submitted responses to the first survey dialog at step 710. If so, the responses are encoded in a query string and the IFrame's location is set to the invite shim. The survey responses are written to a cookie on example.com at step 718 and the invite shim hides the IFrame setting its width and height to 0 pixels at step 720. More specifically, the IFrame is resized by the invite shim to be 0 pixels by 0 pixels which effectively hides the IFrame.

If the user declines participation, the session cookie is set to a status of 'opt out' at step 724 and the IFrame's location is set to the invite shim's URL at step 722. The invite shim checks its query string to determine if the user agreed to participate at step 728 and if so, it redirects to the server page to record the original page load at step 726. If not, it writes a cookie on example.com indicating that the user declined participation at step 730 and the script exits at step 732.

Figure 8:
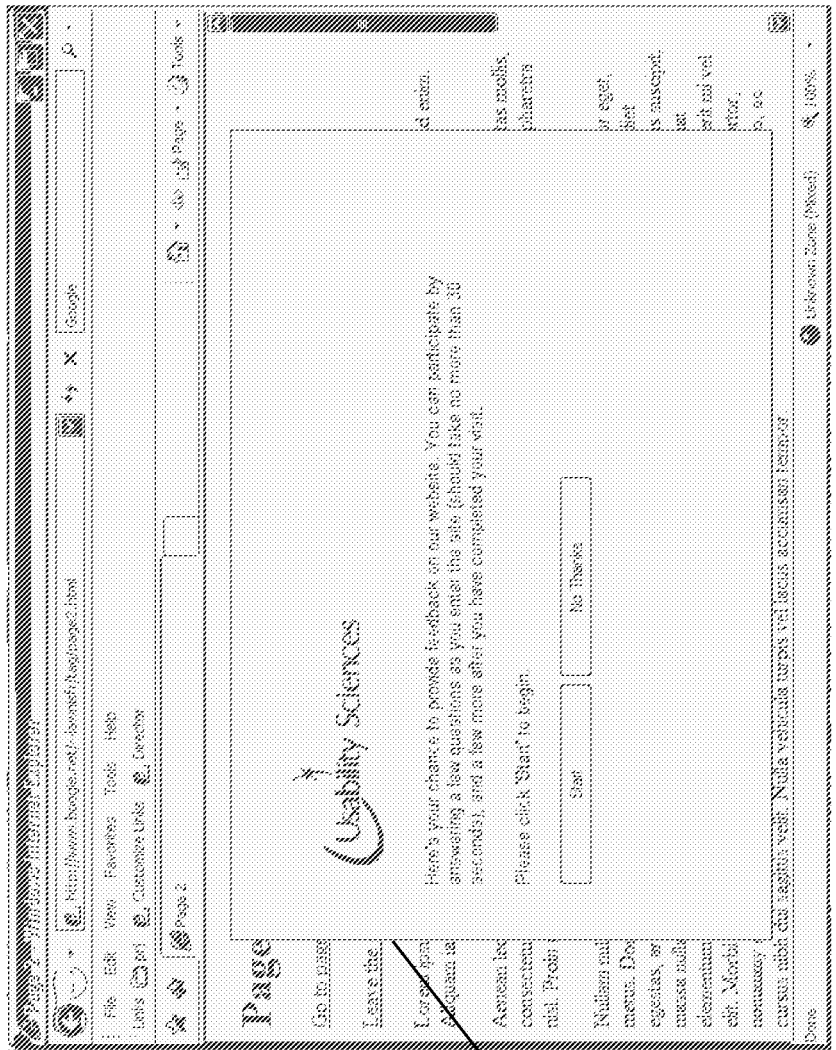
FIG. 8 is a graphical user interface (GUI) illustrating the invite screenshot in accordance with one embodiment of the present invention.

FIG. 8 is a graphical user interface (GUI) 800 illustrating the invite screenshot. An example invitation dialog 802 is presented to the user asking the user to provide feedback or bypass the survey.

Figure 9:
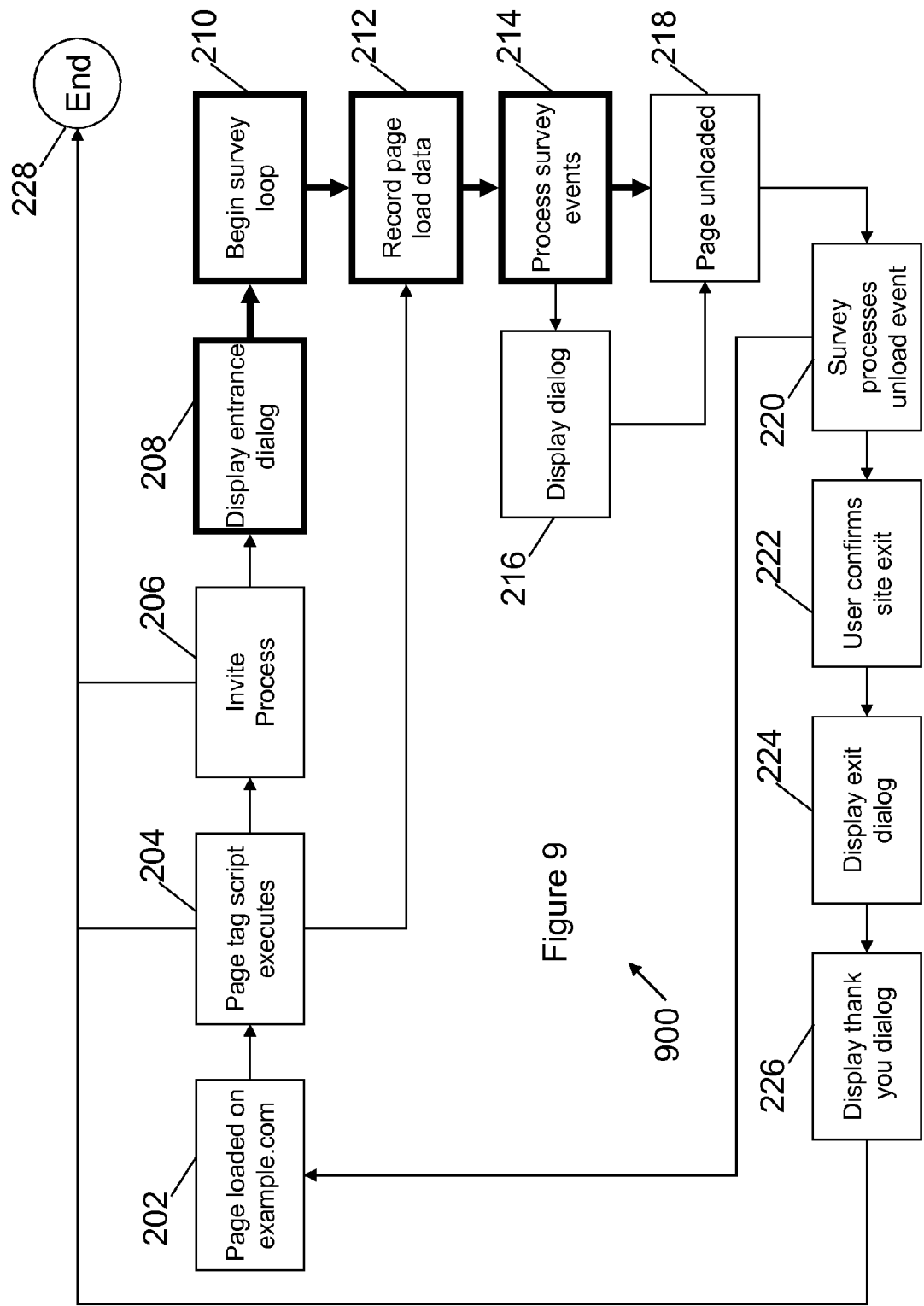
FIG. 9 is a flow diagram illustrating a method for gathering feedback from visitors to a Web site with emphasis on displaying an entrance dialog, a begin survey loop, a record page load data process and a processing of survey events in accordance with one embodiment of the present invention.

FIG. 9 is a flow diagram 900, similar to FIG. 2, illustrating a method for gathering feedback from visitors to a Web site with emphasis on displaying an entrance dialog, beginning a survey loop, recording a page load data process, and processing survey events.

Figure 10:
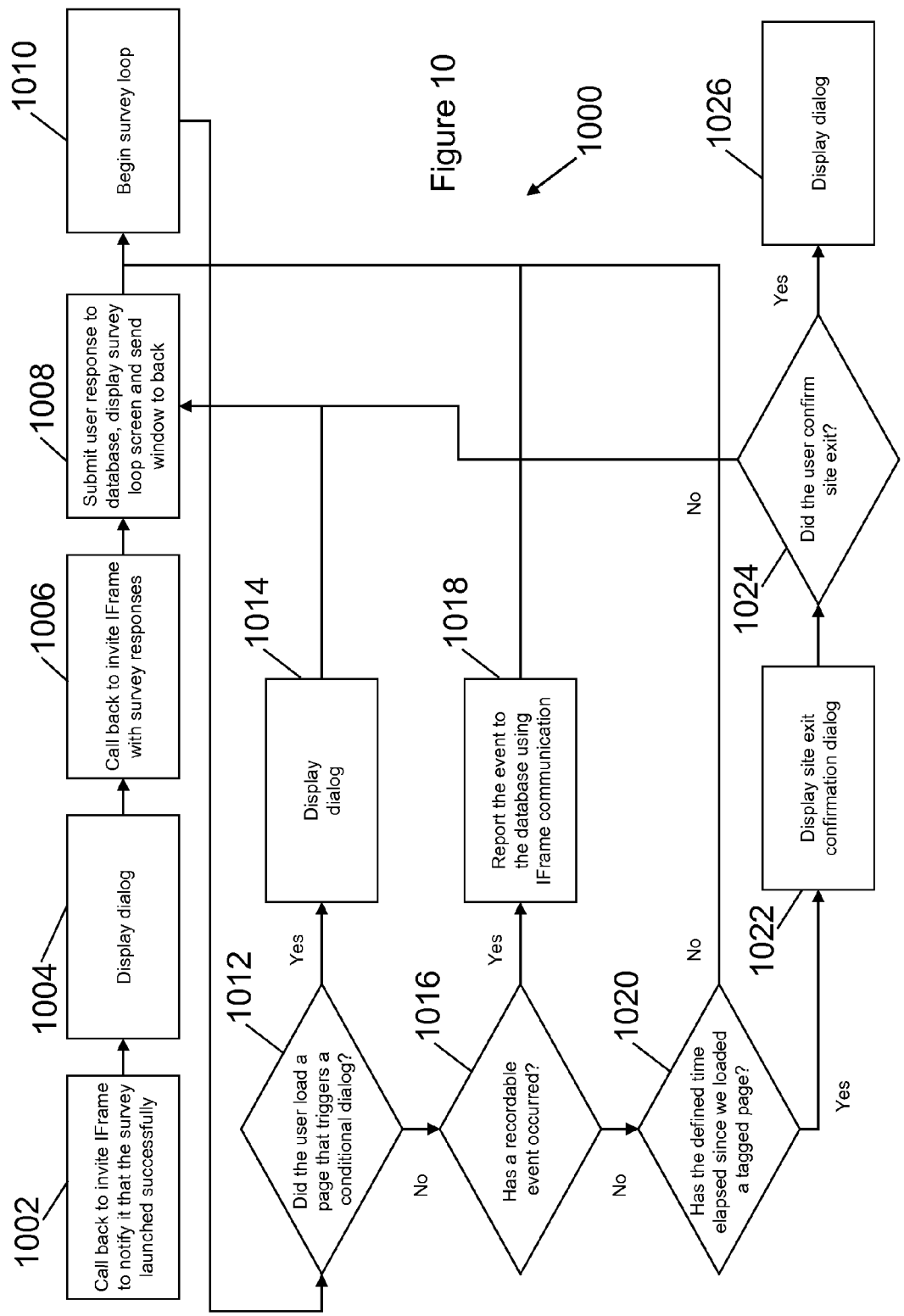
FIG. 10 is a flow diagram illustrating a method for beginning the survey loop or displaying the entrance dialog in accordance with one embodiment of the present invention.

FIG. 10 is a flow diagram 1000 illustrating a method for beginning the survey loop or displaying the entrance dialog.

When the survey dialog first launches, it calls back to the invitation IFrame to notify it that the dialog launched successfully at step 1002 and at step 1004, the survey dialog displays a survey. When the user submits their responses to the survey, the dialog calls back to the invitation IFrame with those responses at step 1006. The responses are submitted to the database and a dialog is displayed informing the user that they should return to the example.com window and continue their visit at step 1008. The dialog contains a button that sends the survey dialog behind other windows when clicked. The survey dialog begins the survey loop at step 1010 and when an event is processed, the survey dialog checks to see if its URL matches a pattern that triggers a conditional dialog at step 1012. If it does, it displays the conditional dialog at step 1014 and if it does not, the script checks if the event is recordable at step 1016. If the event is recordable, the survey submits the event to the database using IFrame communication at step 1018. The event is determined to be recordable if it is in a category of events which can reside in a database. This comprises almost any event that can occur on a webpage. If not, the script checks if the specified interval has elapsed since a tagged page was loaded at step 1020. If the specified interval has elapsed since a tagged page was loaded, a dialog asking the user to confirm that they have indeed completed their visit to example.com at step 1022. At step 1024, the script checks whether the user confirmed site exit and if they did, a survey dialog is displayed at step 1026.

Figure 11:
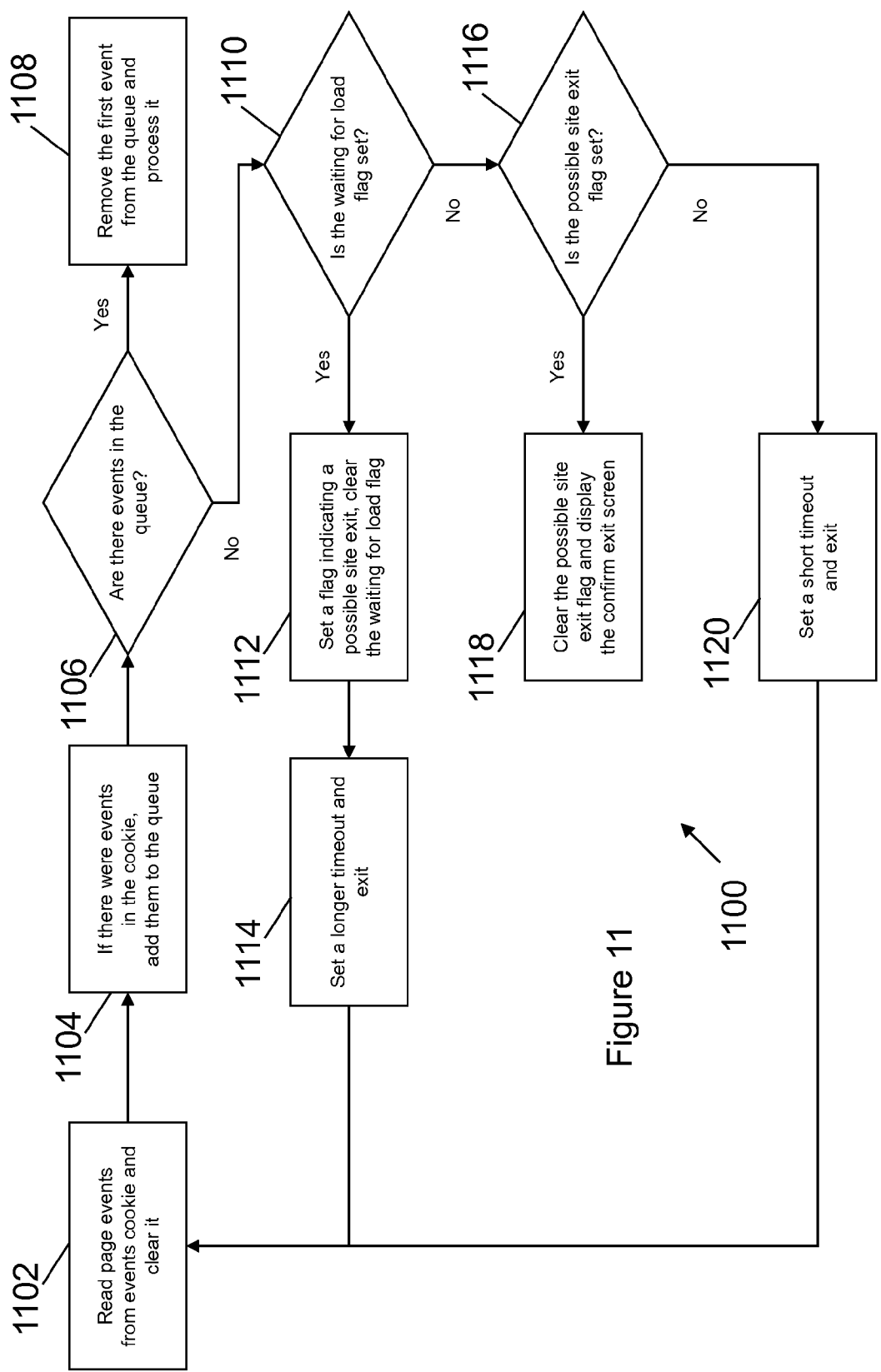
FIG. 11 is a flow diagram illustrating a method for beginning the survey loop in accordance with one embodiment of the present invention.

FIG. 11 is a flow diagram 1100 illustrating a method for beginning the survey loop. When the survey loop timeout fires, any page events in the events cookie are read and the cookie is cleared at step 1102. If there were any events in the cookie, the script adds them to a FIFO queue at step 1104. The script checks to see if there are any events remaining in the queue at step 1106. If so, it removes the first event from the queue and processes it at step 1108. If not, it checks to see if a flag is set indicating that the script is waiting for a page load event at step 1110. If the flag is set, that flag is cleared and another flag is set indicating a possible site exit at step 1112. The script may set a possible exit event when a page does not load fast enough on the other end, or the server does not respond, or it is outside the specified set of domains and pages where a clickstream is collected. The script sets a specified timeout and returns at step 1114. If the waiting for page flag is not set, the script checks to see if a flag indicating a possible site exit is set at step 1116. If so, the flag is cleared and the site exit confirmation page is displayed at step 1118. If not, the script sets a timeout of a given duration and returns at step 1120.

Figure 12:
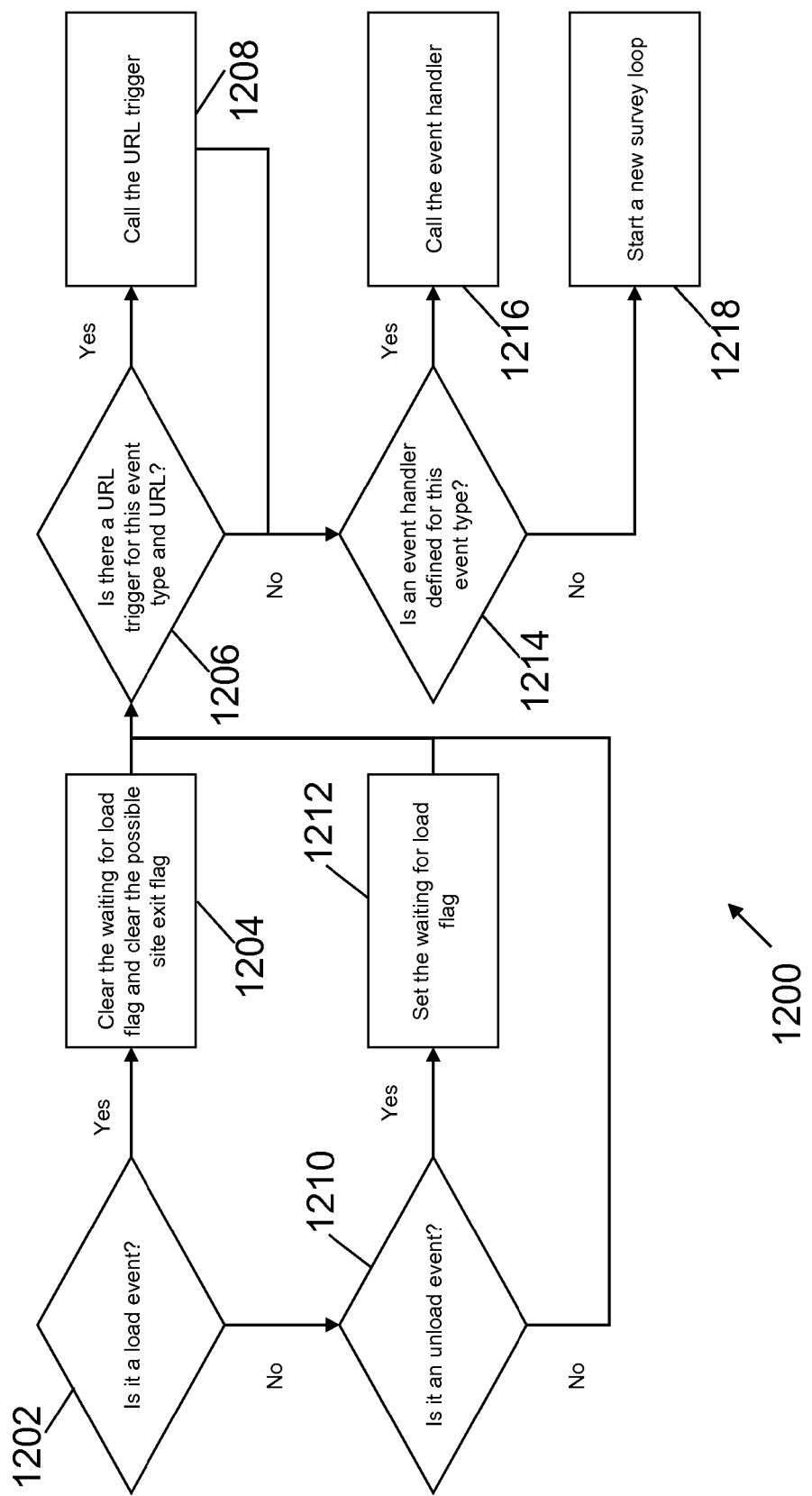
FIG. 12 is a flow diagram illustrating a method for processing of survey events in accordance with one embodiment of the present invention.

FIG. 12 is a flow diagram 1200 illustrating a method for processing survey events. The script checks whether the event is a page load event at step 1202. This is performed in the HTML file which is called by the JavaScript library from the page tag, once the library is loaded on the loading of the whole document. If so, the script clears the flag indicating that the script is waiting for a load event as well as the one indicating a possible site exit at step 1204. In one embodiment, the functionality performed by these flags can be combined into one flag. The script compares the loaded URL to all URL trigger patterns at step 1206. A URL trigger pattern is either a regular expression or a URL definition for a certain function. The URL will be compared with each pattern individually. In one embodiment, the URL can be compared with one or more patterns contemporaneously. If a trigger matches, the function associated with that trigger is called and then the remainder of the triggers are compared to the URL at step 1208. The URL is being compared to the rest of the patterns in the set of defined triggers. If the event is not a load event, the script checks to see if it is an unload event at step 1210. If it is, the waiting for load flag is set at step 1212. The script checks to see if there is an event handler for the event's type at step 1214, and if so, that handler is called and processing is complete at step 1216. If not, processing is complete and a new survey loop begins at step 1218.

Figure 13:
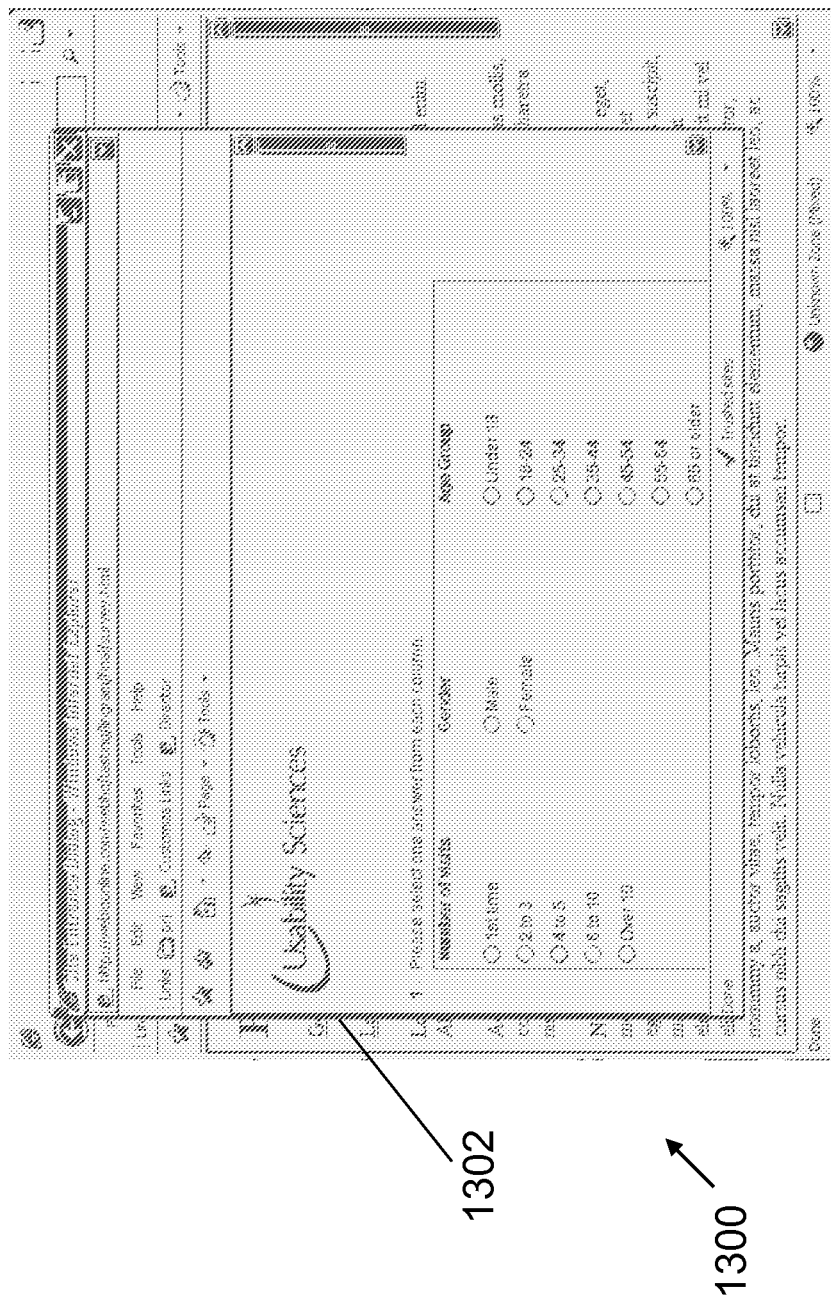
FIG. 13 is a GUI illustrating the entrance dialog or entrance survey in accordance with one embodiment of the present invention.

FIG. 13 is a GUI 1300 illustrating the entrance dialog or entrance survey. The survey dialog displays an example survey 1302 which includes one or more questions. Although depicted as 'multiple choice' questions, the questions as well as the responses can be presented and received in a number of formats including written, typed, audio, video, multimedia, and the like.

Figure 14:
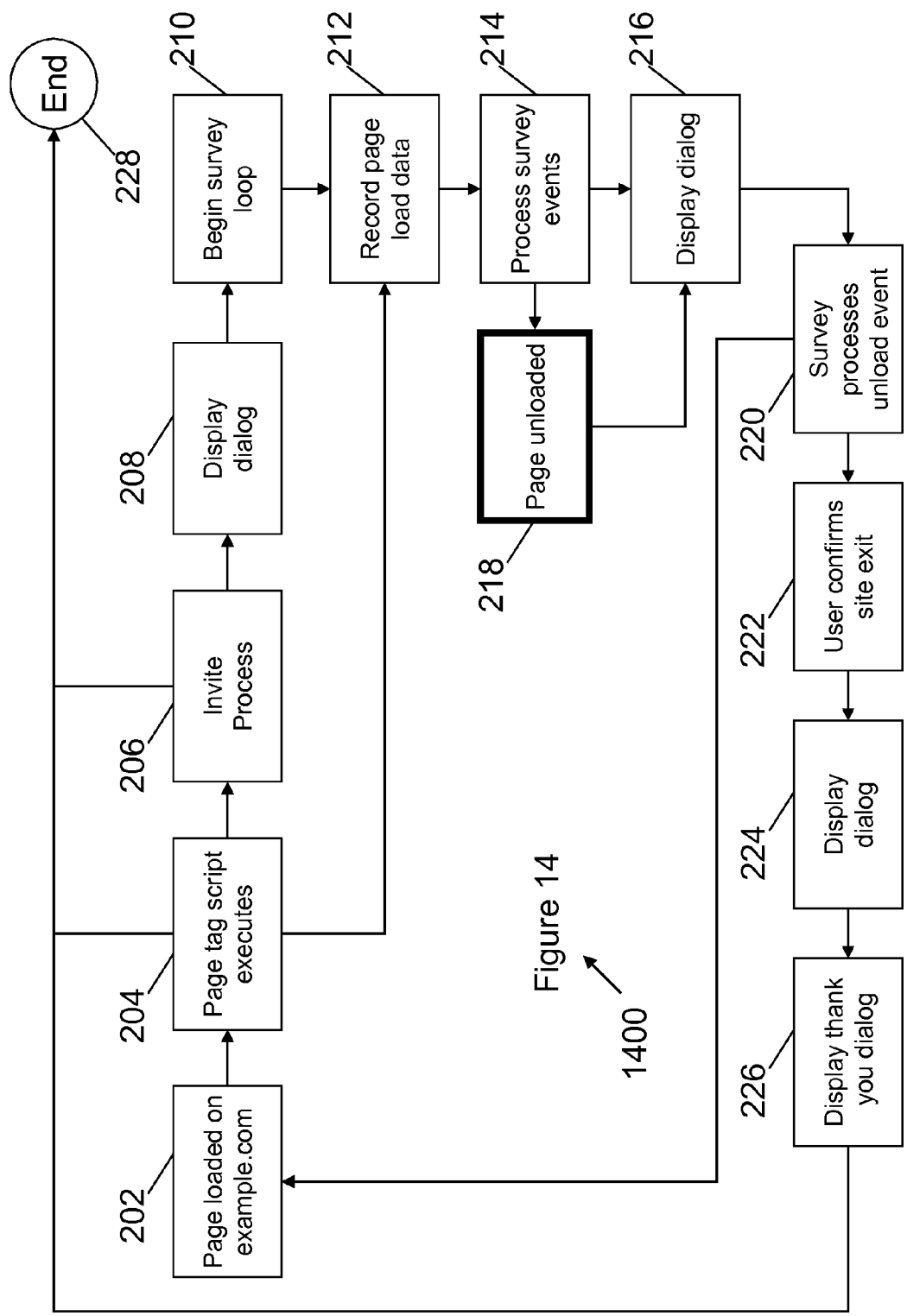
FIG. 14 is a flow diagram illustrating a method for gathering feedback from visitors to a Web site with emphasis on displaying a dialog in accordance with one embodiment of the present invention.

FIG. 14 is a flow diagram 1400, similar to FIG. 2, illustrating a method for gathering feedback from visitors to a Web site with emphasis on displaying a dialog.

Figure 15:
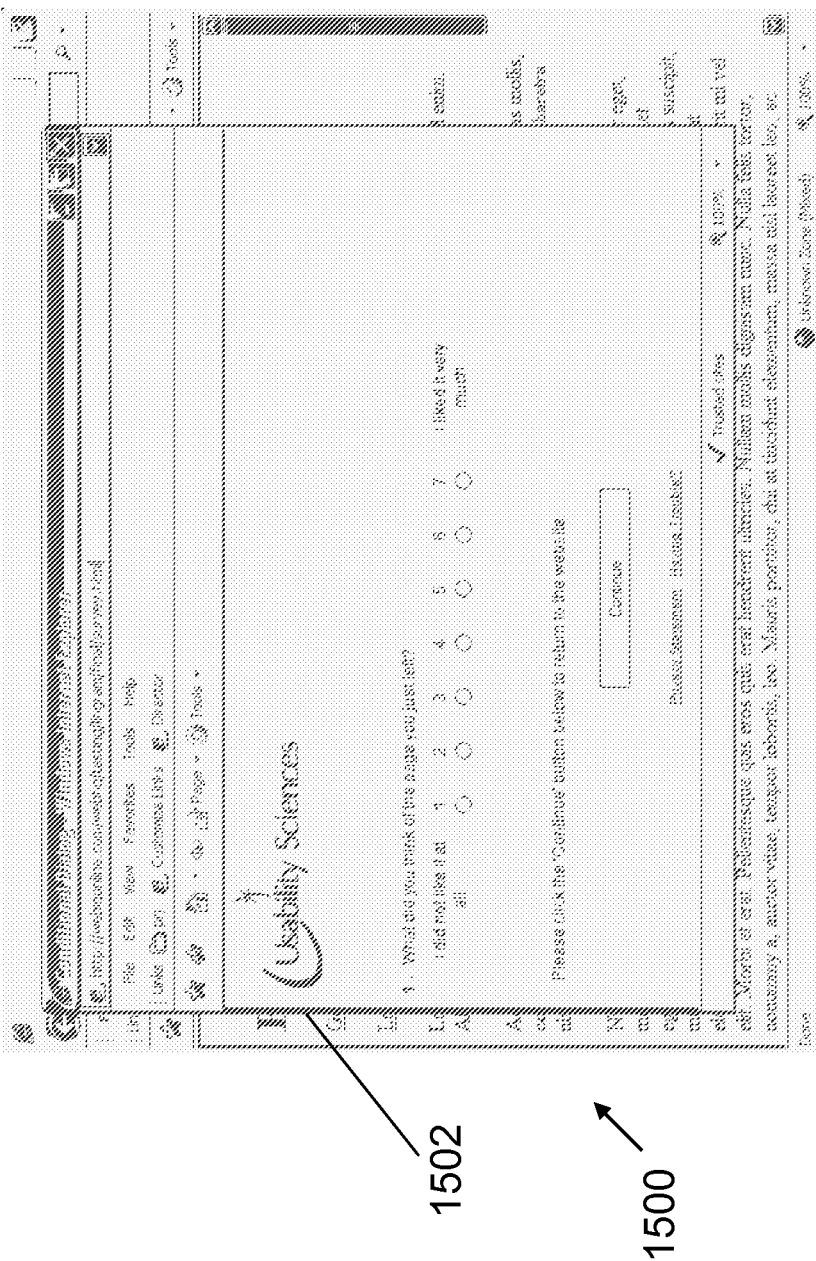
FIG. 15 is a GUI illustrating the conditional dialog screenshot in accordance with one embodiment of the present invention.

FIG. 15 is a GUI 1500 illustrating a conditional dialog screenshot that includes an example of a conditional survey 1502.

Figure 16:
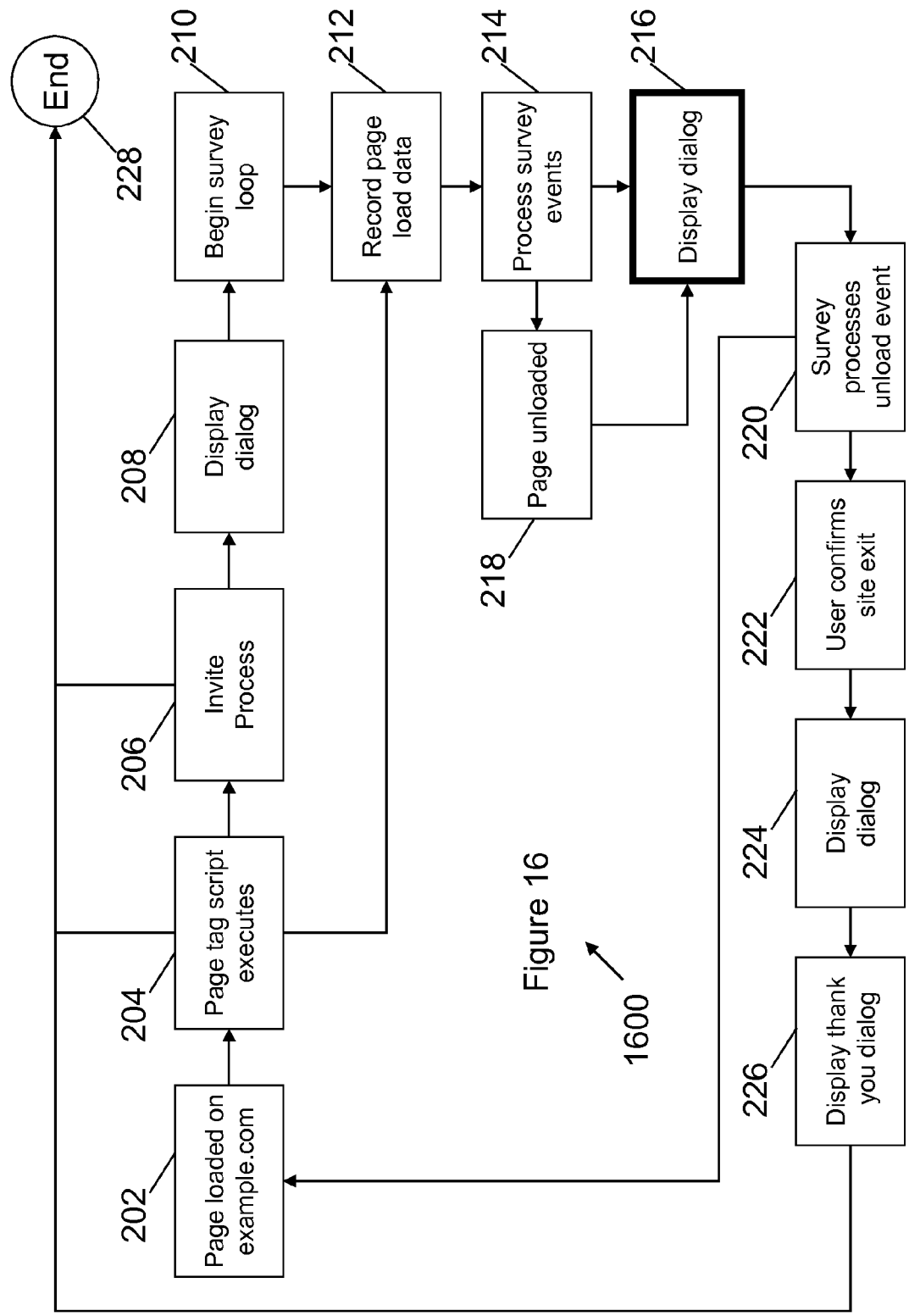
FIG. 16 is a flow diagram illustrating a method for gathering feedback from visitors to a Web site with emphasis on a page unload process in accordance with one embodiment of the present invention.

FIG. 16 is a flow diagram 1600, similar to FIG. 2, illustrating a method for gathering feedback from visitors to a Web site with emphasis on a page unload process.

Figure 17:
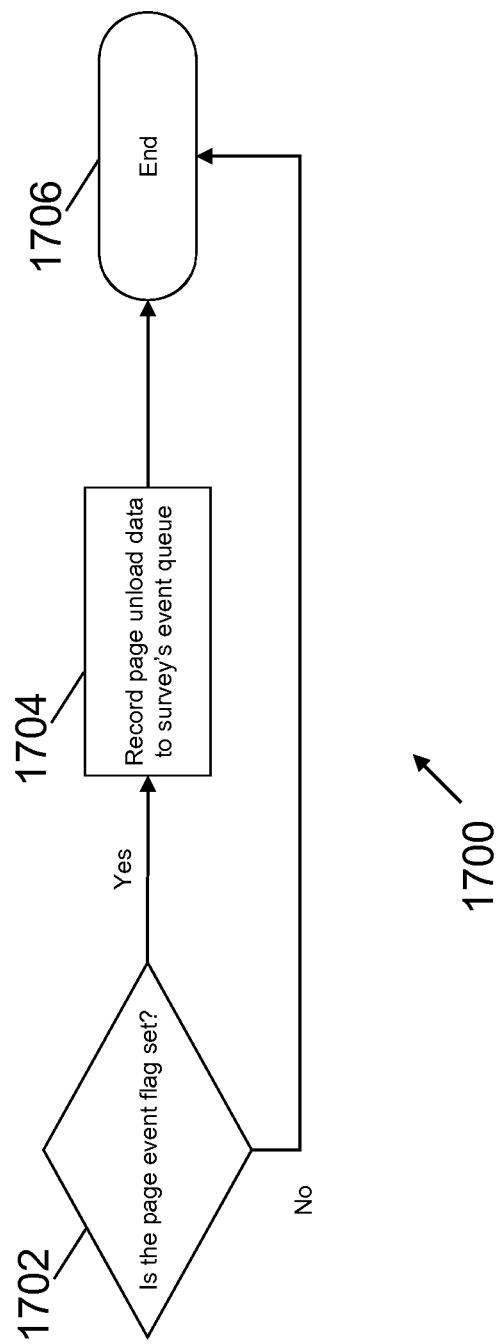
FIG. 17 is a flow diagram illustrating a method for the page unload process in accordance with one embodiment of the present invention.

FIG. 17 is a flow diagram 1700 illustrating a method for the page unload process. The script checks whether a flag was set indicating that a page event was processed at step 1702. If so, the script adds the unload event to the event queue cookie at step 1704. If not, the process ends at step 1706.

Figure 18:
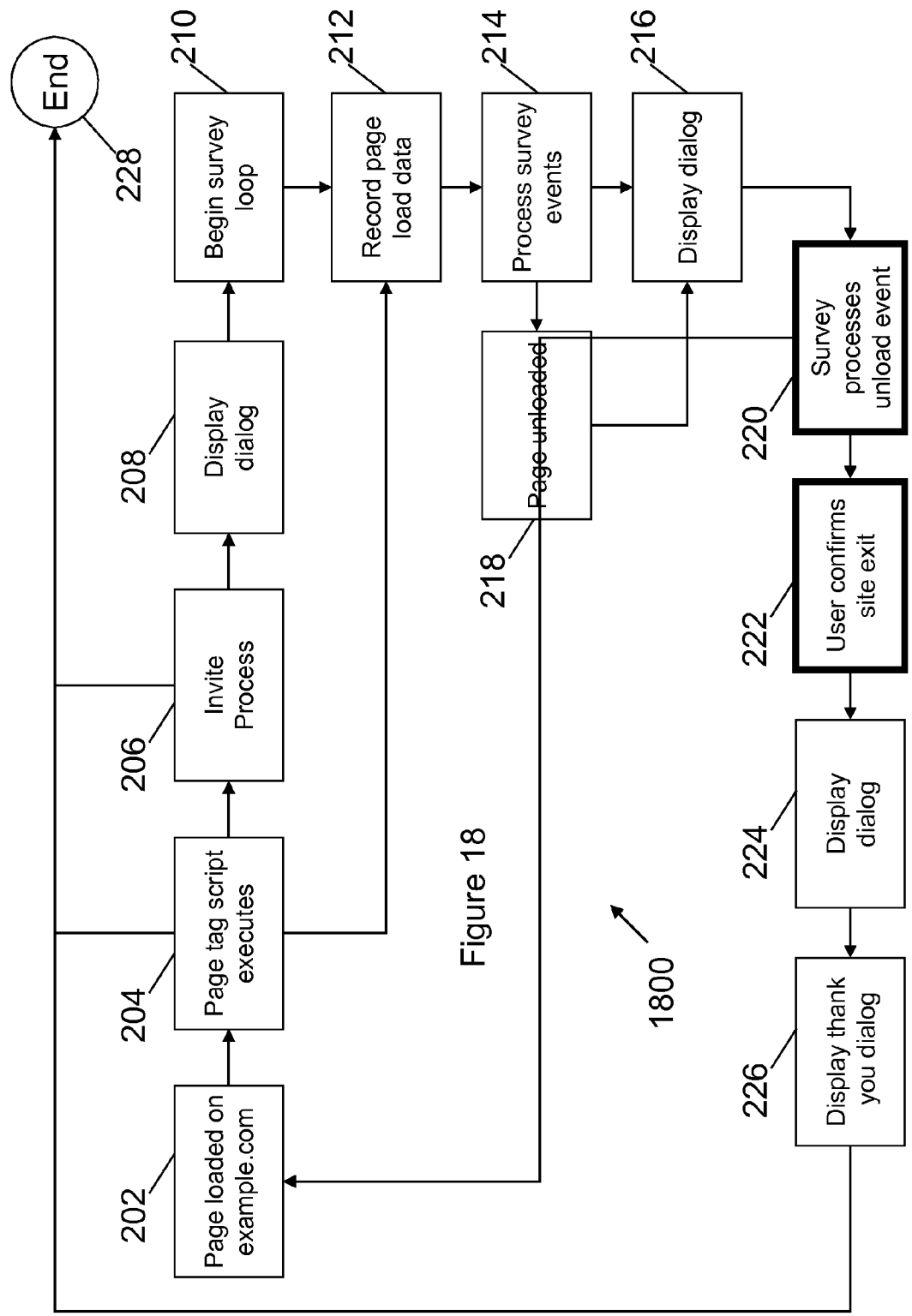
FIG. 18 is a flow diagram illustrating a method for gathering feedback from visitors to a Web site with emphasis on a site exit confirmation process in accordance with one embodiment of the present invention.

FIG. 18 is a flow diagram 1800, similar to FIG. 2, illustrating a method for gathering feedback from visitors to a Web site with emphasis on a site exit confirmation process.

Figure 19:
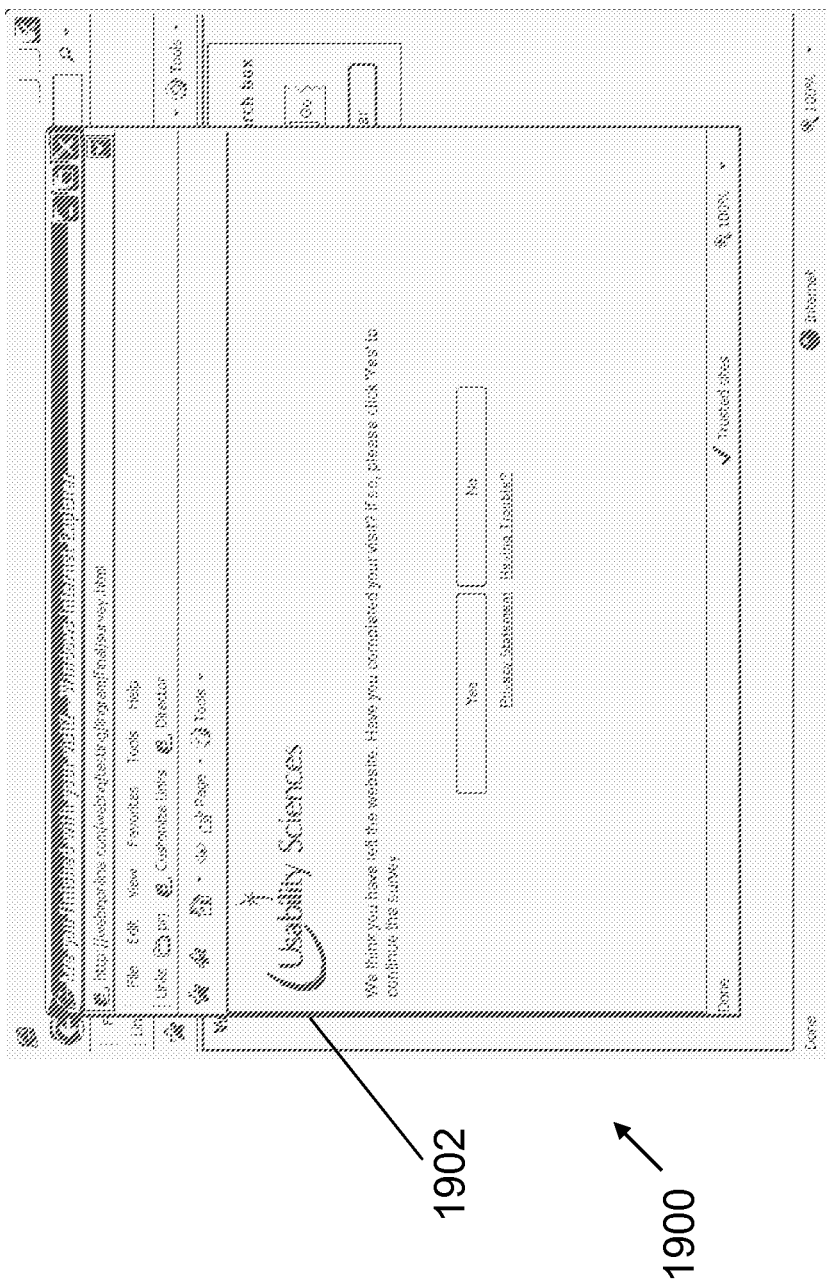
FIG. 19 is a GUI illustrating the site exit confirmation screenshot in accordance with one embodiment of the present invention.

FIG. 19 is a GUI 1900 illustrating the site exit confirmation screenshot with an example site exit confirmation dialog 1902.

Figure 20:
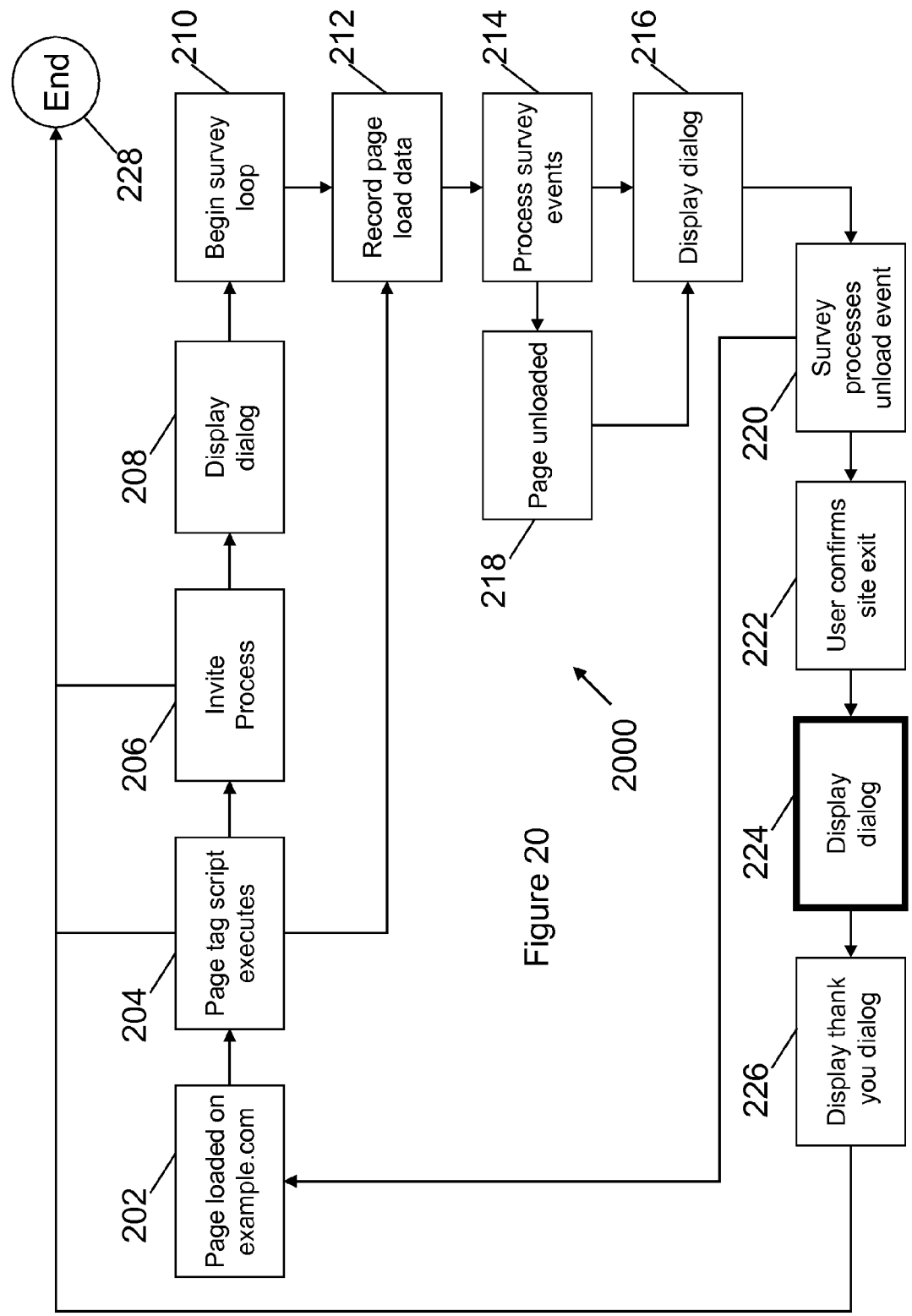
FIG. 20 is a flow diagram illustrating a method for gathering feedback from visitors to a Web site with emphasis on a display dialog in accordance with one embodiment of the present invention.

FIG. 20 is a flow diagram 2000, similar to FIG. 2, illustrating a method for gathering feedback from visitors to a Web site with emphasis on a display dialog.

Figure 21:
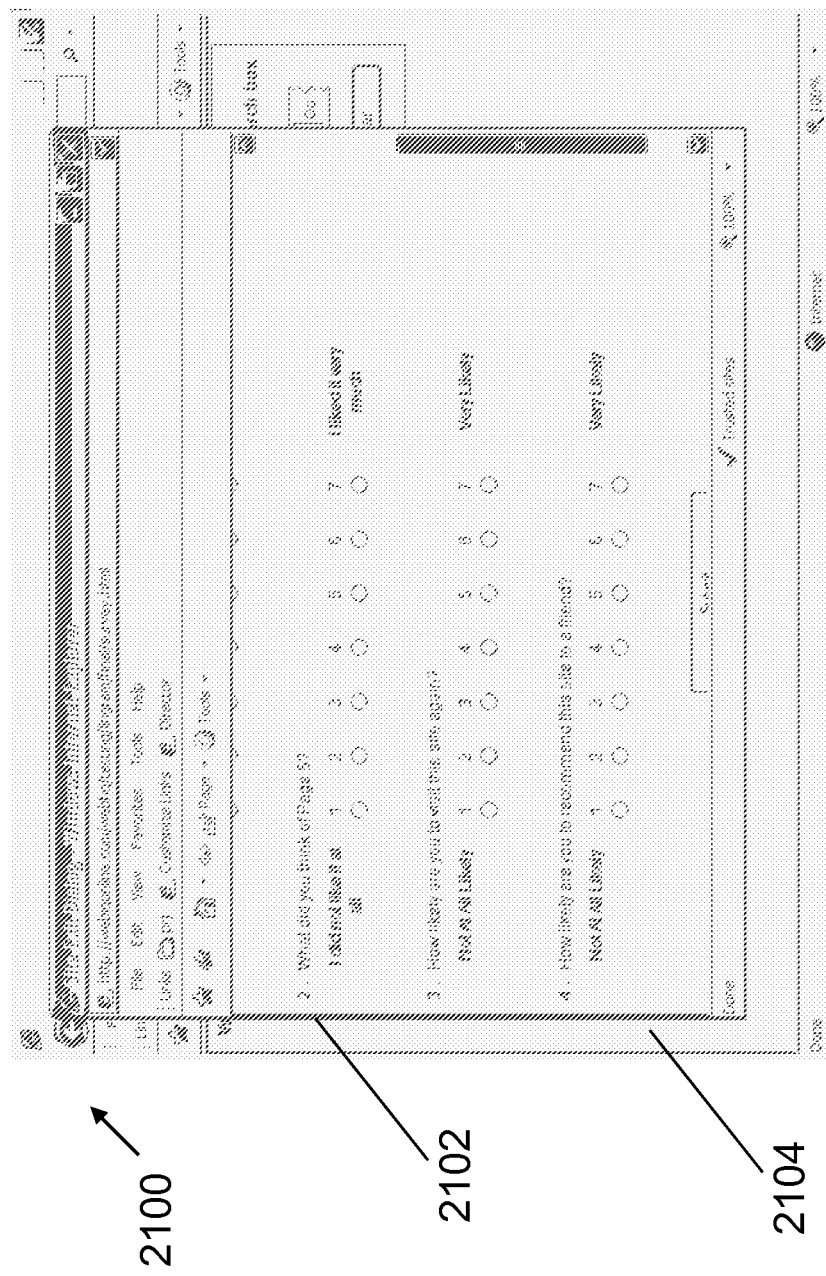
FIG. 21 is a GUI illustrating the site exit confirmation screenshot in accordance with one embodiment of the present invention.

FIG. 21 is a GUI 2100 illustrating the site exit confirmation screenshot. A survey question that is only displayed if the user loads the web page called, for example, 'Page 5' is depicted at 2102 and the survey dialog window displays an example survey including a conditional question is depicted at 2104.

Figure 22:
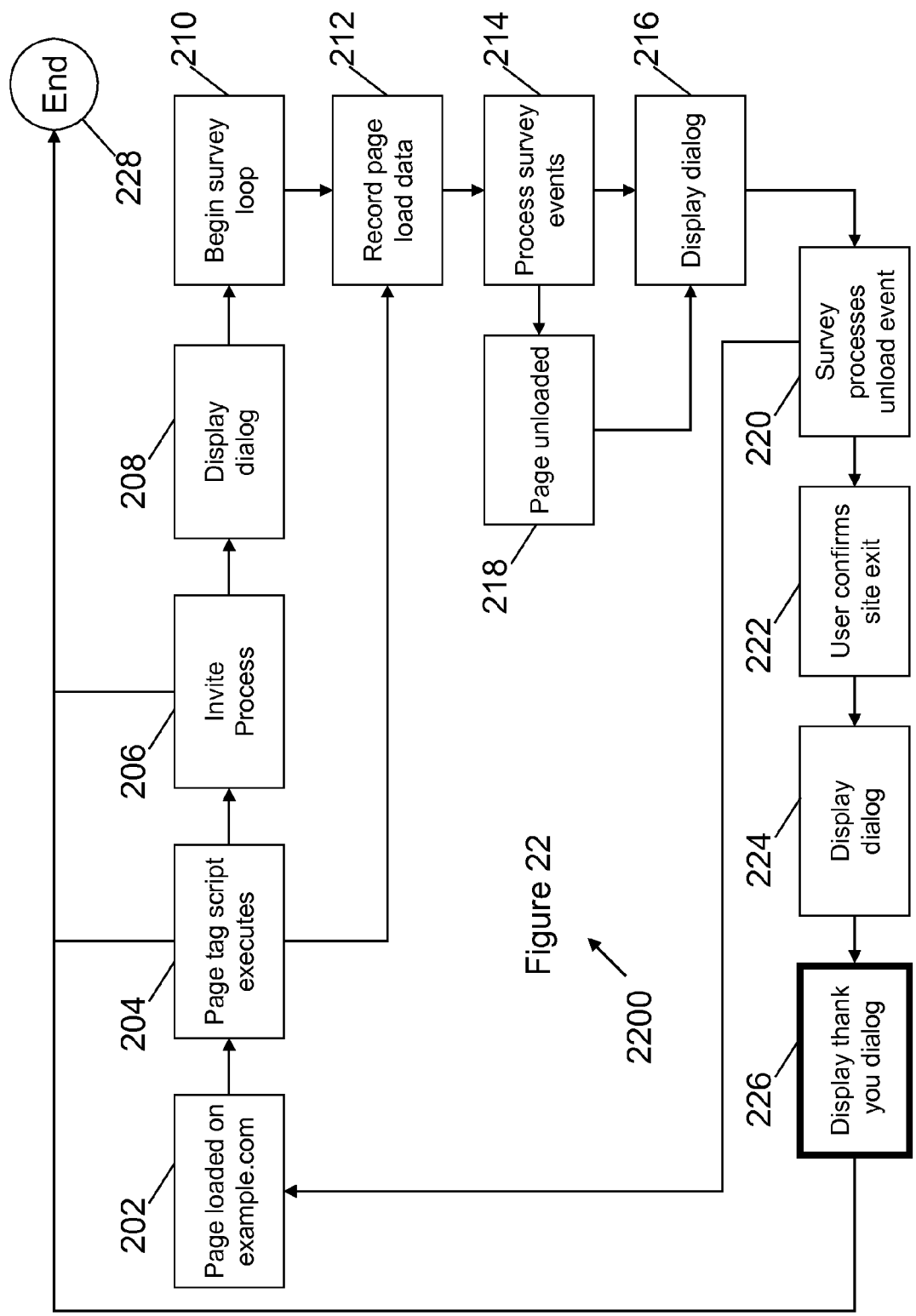
FIG. 22 is a flow diagram illustrating a method for gathering feedback from visitors to a Web site with emphasis on a thank you dialog in accordance with one embodiment of the present invention.

FIG. 22 is a flow diagram 2200, similar to FIG. 2, illustrating a method for gathering feedback from visitors to a Web site with emphasis on a thank you dialog.

Figure 23:
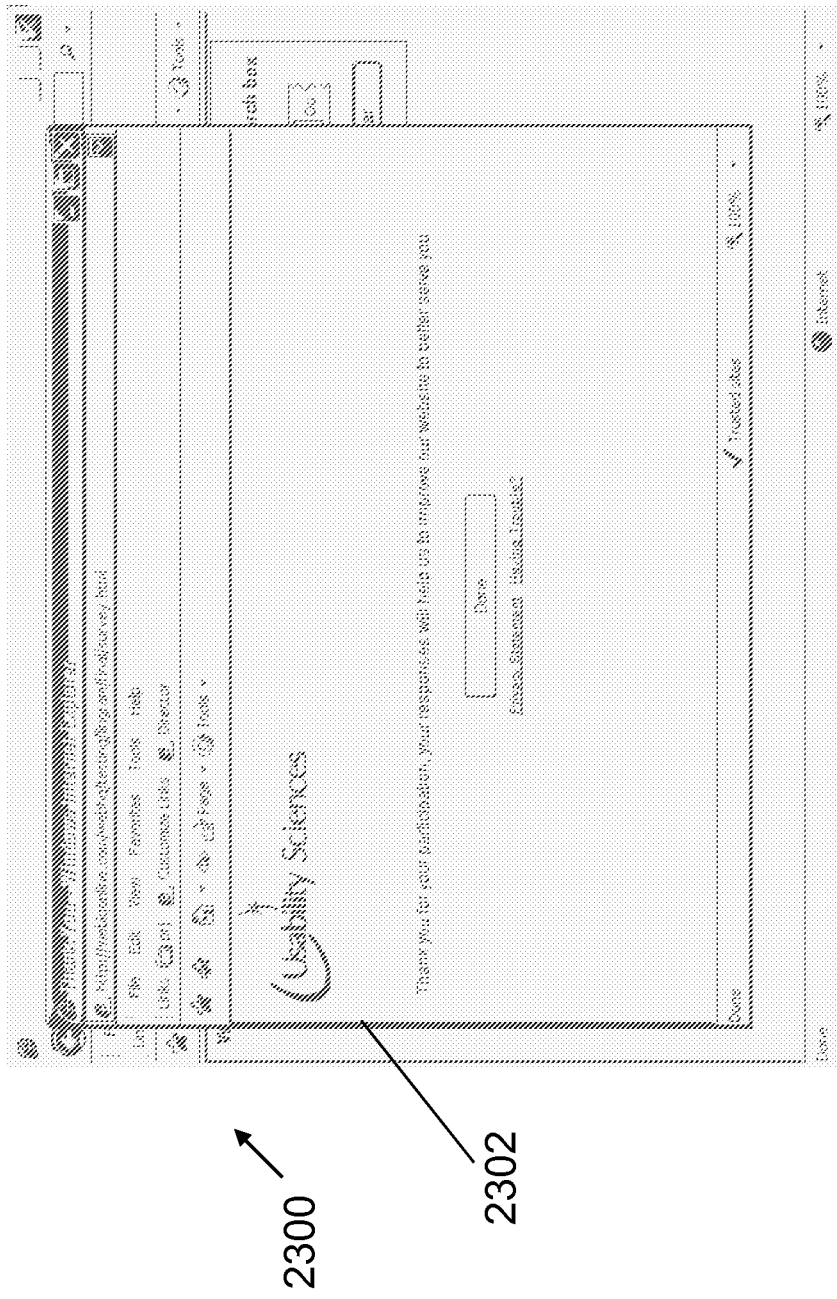
FIG. 23 is a GUI illustrating the thank you dialog screenshot in accordance with one embodiment of the present invention.

FIG. 23 is a GUI 2300 illustrating the thank you dialog screenshot with an example thank you dialog 2302.

Figure 24:
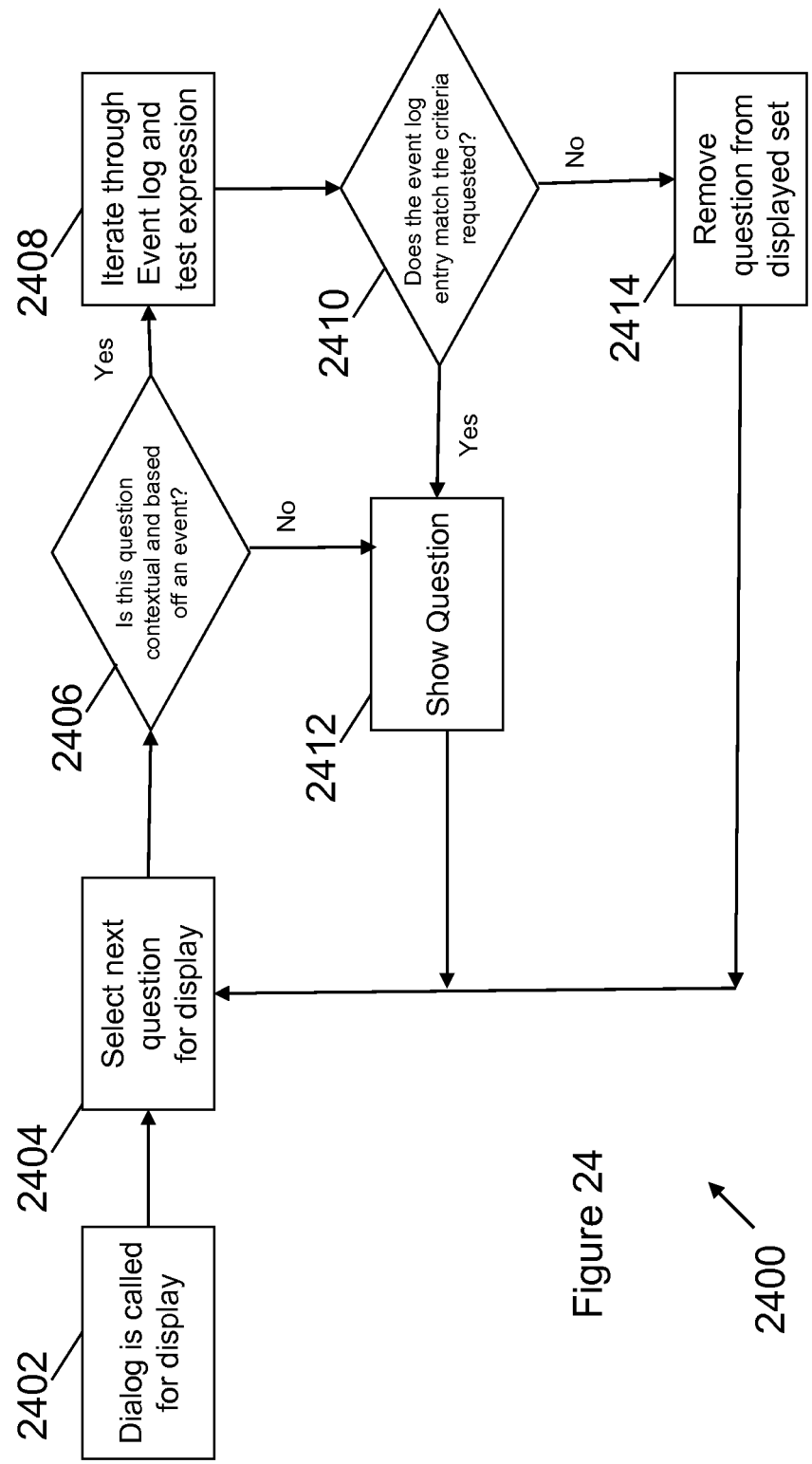
FIG. 24 is a flow diagram illustrating the display dialog process in accordance with one embodiment of the present invention.

FIG. 24 is a flow diagram 2400 illustrating the display dialog process. The survey dialog is called by the script for display at step 2402. The survey dialog selects the next question in the list of questions to be displayed at step 2404. The questions are stored in separate dialogs, and have their own set of custom programming. For a given question, a set of logic can conditionalize the question (with a logic expression that evaluates to either true or false), which makes the question contextual. Many factors can be used to determine the conditionality. These questions also have mutable properties, which based on certain factors can be used to change said questions. If a user has been asked the same survey before on the same website, the survey can determine that and change the questions accordingly. As well, historical data can be used to change the answers if a given response is too broad or too narrow. If this question is contextual, and based on either a user response or event log action, the survey queries either the event log or condition which is required for display at step 2406. The event log is iterated through, looking for the conditional event in question at step 2408. The conditional event is given by a Boolean expression which, if not based on a user response (e.g. a user answers question A in a certain manner to cause question B to be displayed), must use the event log, that contains all of the loaded and unloaded pages to that point. The survey dialog searches each loaded URL for the trigger pattern specified by the conditional event in 2406. If the event log entry is found, the conditional question is shown at step 2410. The question will be displayed to the user inside the dialog at step 2412 and the question will not be displayed to the user at step 2414 which is used if the event log entry is not found.

Figure 25:
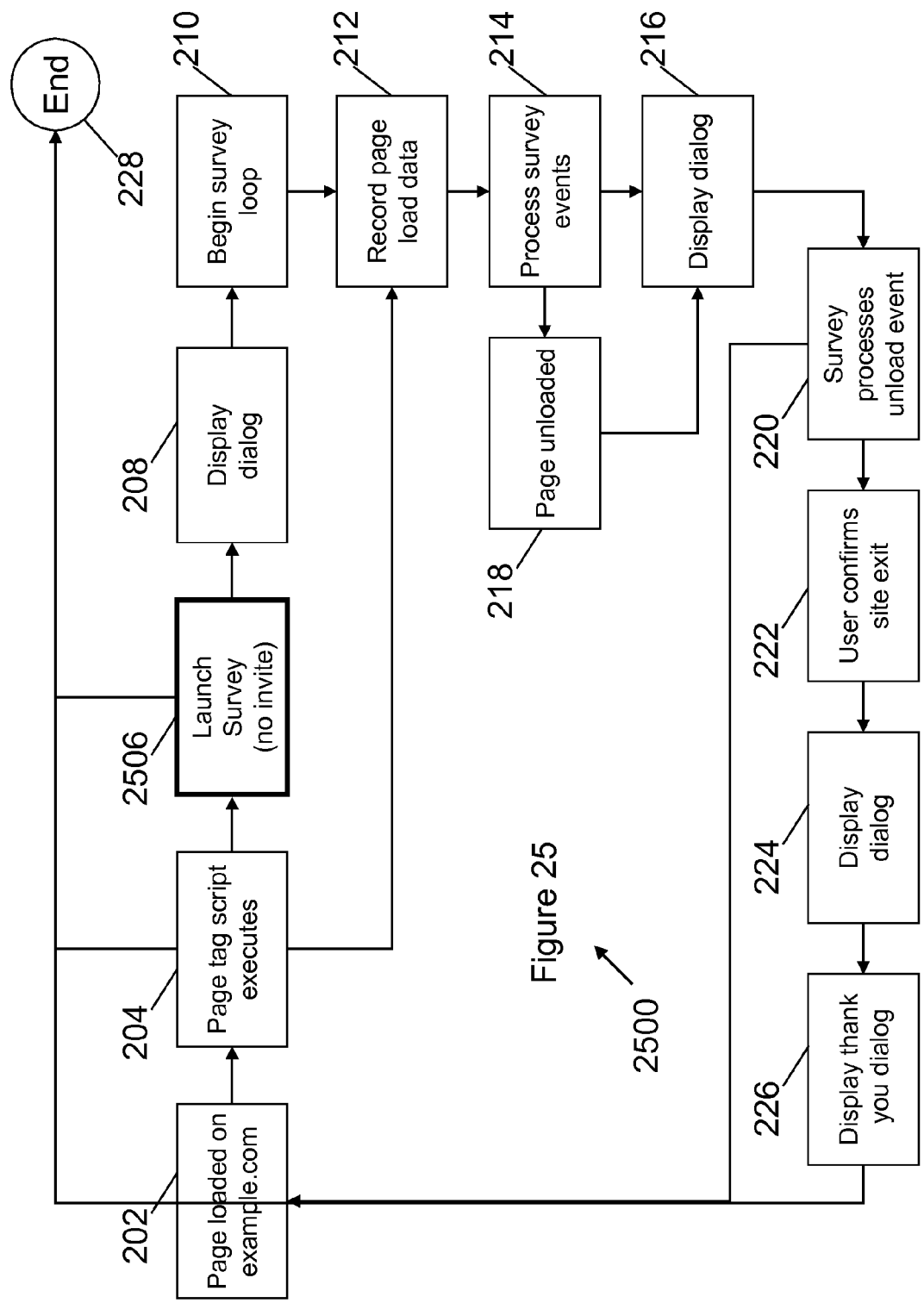
FIG. 25 is a flow diagram illustrating a method for gathering feedback from visitors to a Web site without an invite process in accordance with one embodiment of the present invention.

FIG. 25 is a flow diagram 2500 illustrating a method for gathering feedback from visitors to a Web site without an invite process. The functionality performed by the various elements or steps are similar to those described above with the exception of step 2506 in which the script will launch the survey without asking the user if they wish to participate.

FIG. 26 is a system diagram 2600 depicting a processor 2602 and a memory 2604 communicably coupled to one another. The memory 2604 stores an instruction set executable on the processor 2602. Executing the instructions causes the processor 2602 to receive responses to a survey, determine if a page unload event followed by a page load event occurs within a period of time, and determine if the user has left the web site when the page unload event followed by the page load event does not occur within the period of time. In one embodiment, the processor 2602 may take any one of the actions described previously herein and in any order.

In accordance with one embodiment of the present invention, a method for providing a survey to a user comprises accessing a web site by the user, determining if the user is qualified to partake in a survey related to the web site, tracking the user's interaction with the web site when the user is qualified to partake in the survey, presenting the survey to the user based on the user's interaction, receiving responses to the survey, tracking the user's further interaction with the web site, determining if a page unload event followed by a page load event occurs within a period of time, determining if the user has left the web site when the page unload event followed by the page load event does not occur within the period of time, presenting a static first portion of an additional survey to the user, and presenting a dynamic second portion of the additional survey to the user based on at least one of: the user's further interaction with the web site, the user's interaction with the web site, and the user's responses to the survey, when it is determined that the user has left the web site.

The method further comprises receiving responses from the user based on at least one of the static first portion of the additional survey and the dynamic second portion of the additional survey, presenting the static first portion of the additional survey to the user and presenting the dynamic second portion of the additional survey to the user during at least one of: serially, in parallel, and after an amount of time, writing a cookie on the web site to ensure the survey is not presented to the user when the user re-access the web site and when the survey is inactive, ensuring the survey is not presented to the user during at least one of: an elapsed amount of time and never, and determining if the survey is inactive includes at least one of: the user closing the survey, an amount of time elapsing, completion of the first portion of the additional survey, and completion of the second portion of the additional survey.

The method further comprises determining if the user has left the web site occurs during at least one of: when the user has indicated that the user has left the web site, and based on the period of time, wherein the qualification to partake in the survey is based on at least one of: a system configuration of the user, an IP address of the user, a number of page loads within the site, a time spent interacting with the site, a past participation of the user, and a random sample rate of all users, wherein the presenting includes at least one of: inviting the user to participate in the survey, the user initiates a launching of the survey, and automatically launching the survey based on the user engaging with the web site, and further comprises sending at least one of: the survey responses, the static first portion of the additional survey responses, and the dynamic second portion of the additional survey responses to an operator of the web site and dynamically altering the web site based on the sending.

In accordance with one embodiment of the present invention, a computer readable medium comprises instructions for: tracking a user's interaction with a web site, presenting a survey to the user based on the user's interaction, receiving responses to the survey, tracking the user's further interaction with the web site, presenting a dynamic survey to the user based on the user's further interaction with the web site, receiving responses to the dynamic survey, determining if a page unload event followed by a page load event occurs within a period of time, determining if the user has left the web site when the page unload event followed by the page load event does not occur within the period of time, presenting a static first portion of an additional survey to the user, and presenting a dynamic second portion of the additional survey to the user based on at least one of: the user's further interaction with the web site, the user's interaction with the web site, the user's responses to the survey, the user's responses to the dynamic survey, when it is determined that the user has left the web site.

The computer readable medium further comprises instructions for loading at least one cookie indicating that the user has already participated or opted out of participation of at least one of the dynamic survey and the additional survey, and for determining if an IFrame already exists in a Document Object Model (DOM) for the page and if the IFrame does not exist, creating an IFrame and inserting it into the DOM, and creating a server page Universal Resource Locator with the page load data encoded in its query string and setting a location of the IFrame to it.

In accordance with one embodiment of the present invention, a system for providing a survey to a user, comprises a first server, a second server, and an electronic device communicably coupled to the first server and to the second server, wherein the second server interacts with the electronic device by providing an invite Hypertext Markup Language (HTML) file and a survey HTML file and includes various JavaScript libraries and an Active Server Pages (ASP) page that records various events occurring at the electronic device when a user interacts with a loaded web page from the first server, wherein the first server includes a JavaScript page tag that is provided by the second server and that references the JavaScript libraries and an invite HTML file that is used to display an invitation to a user interacting with the loaded web page.

Within the system, the JavaScript page tag is provided by the second server as the web page is loaded but before the web page is fully loaded, wherein the JavaScript page tag comprises an object model used to perform communication between the second server and the electronic device. The system also comprises a database that records when the web page is loaded, wherein the database is communicably coupled to the first server, wherein if another JavaScript page tag is not loaded within a certain period of time, a survey dialog window is presented, via the electronic device, in front of any open web page, and wherein a dialog is displayed for a user to confirm that they have left the site.

In accordance with one embodiment of the present invention, all or a portion of the described and depicted methods and steps can be accomplished via a computer readable medium that comprises instructions (i.e. software) which can be fully or partially executed by or run on one or more of the described and depicted elements.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for providing a survey to a user, comprising:
accessing a web site by the user;
determining if the user is qualified to partake in a survey related to the web site;
tracking the user's interaction with the web site when the user is qualified to partake in the survey;
presenting the survey to the user based on the user's interaction;
receiving responses to the survey;
tracking the user's further interaction with the web site;
determining if a page unload event followed by a page load event occurs within a period of time;
determining if the user has left the web site when the page unload event followed by the page load event does not occur within the period of time;
determining if an IFrame already exists in a Document Object Model (DOM) for a page associated with the survey, and if the IFrame does not exist, creating an IFrame and inserting it into the DOM, and creating a server page Universal Resource Locator (URL) with page load data encoded in its query string and setting a location of the IFrame to the server page URL;
presenting a static first portion of an additional survey to the user; and
presenting a dynamic second portion of the additional survey to the user based on at least one of: the user's further interaction with the web site, the user's interaction with the web site, and the user's responses to the survey, when it is determined that the user has left the web site.

2. The method of claim 1 comprising receiving responses from the user based on at least one of the static first portion of the additional survey and the dynamic second portion of the additional survey.

3. The method of claim 1 comprising presenting the static first portion of the additional survey to the user and presenting the dynamic second portion of the additional survey to the user during at least one of: serially, in parallel, and after an amount of time.

4. The method of claim 1 comprising writing a cookie on the web site to ensure the survey is not presented to the user when the user re-access the web site and when the survey is inactive.

5. The method of claim 4 comprising ensuring the survey is not presented to the user during at least one of: an elapsed amount of time and never.

6. The method of claim 4 comprising determining if the survey is inactive includes at least one of: the user closing the survey, an amount of time elapsing, completion of the first portion of the additional survey, and completion of the second portion of the additional survey.

7. The method of claim 1 comprising determining if the user has left the web site occurs during at least one of: when the user has indicated that the user has left the web site, and based on the period of time.

8. The method of claim 1, wherein the qualification to partake in the survey is based on at least one of: a system configuration of the user, an IP address of the user, a number of page loads within the site, a time spent interacting with the site, a past participation of the user, and a random sample rate of all users.

9. The method of claim 1, wherein the presenting includes at least one of:
 inviting the user to participate in the survey, the user initiates a launching of the survey, and automatically launching the survey based on the user engaging with the web site.

10. The method of claim 1 comprising sending at least one of: the survey responses, the static first portion of the additional survey responses, and the dynamic second portion of the additional survey responses to an operator of the web site.

11. The method of claim 10 comprising dynamically altering the web site based on the sending.

\* \* \* \* \*